(12) United States Patent
Kano et al.

(10) Patent No.: US 12,155,264 B2
(45) Date of Patent: Nov. 26, 2024

(54) UNINTERRUPTIBLE POWER SUPPLY APPARATUS

(71) Applicant: TMEIC Corporation, Chuo-ku (JP)

(72) Inventors: Masamichi Kano, Chuo-ku (JP);
Hidenobu Tajima, Chuo-ku (JP);
Yousuke Hayashi, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 18/257,637

(22) PCT Filed: Jan. 29, 2021

(86) PCT No.: PCT/JP2021/003267
§ 371 (c)(1),
(2) Date: Jun. 15, 2023

(87) PCT Pub. No.: WO2022/162876
PCT Pub. Date: Aug. 4, 2022

(65) Prior Publication Data
US 2024/0120769 A1  Apr. 11, 2024

(51) Int. Cl.
*H02J 9/06* (2006.01)

(52) U.S. Cl.
CPC .............. *H02J 9/062* (2013.01); *H02J 9/068* (2020.01)

(58) Field of Classification Search
CPC ........ Y02T 10/62; Y02T 10/64; B60W 10/08; B60W 20/00; B60W 10/06; B60W 10/02; B60W 10/10; B60W 2540/10; B60K 6/48; B60K 6/547; H02J 9/062; H02J 9/061; Y02E 60/50; H04L 9/3247; Y04S 20/20; Y02B 70/30; H02M 1/4225; H02M 1/007
(Continued)

(56) References Cited

U.S. PATENT DOCUMENTS

| | | | |
|---|---|---|---|
| 2017/0149276 A1* | 5/2017 | Toyoda | H02J 9/062 |
| 2018/0212460 A1* | 7/2018 | Shibata | H02J 9/062 |
| 2021/0126485 A1* | 4/2021 | Abe | H02J 9/062 |

FOREIGN PATENT DOCUMENTS

| | | |
|---|---|---|
| JP | 2008-187793 A | 8/2008 |
| JP | 2018-170937 A | 11/2018 |

(Continued)

OTHER PUBLICATIONS

International Search Report issued Apr. 20, 2021 in PCT/JP2021/003267, filed on Jan. 29, 2021, 3 pages.
(Continued)

*Primary Examiner* — Elim Ortiz
(74) *Attorney, Agent, or Firm* — Oblon, McClelland, Maier & Neustadt, L.L.P.

(57) ABSTRACT

In the present uninterruptible power supply apparatus, in a switching period in which a bypass power feed mode is switched to an inverter power feed mode, a semiconductor switch is turned on, a first electromagnetic contactor is turned off, a second electromagnetic contactor is turned on and, in this state, an inverter is activated to start a lap power feed mode, and the semiconductor switch is turned off to end the lap power feed mode. Accordingly, the lap power feed mode can be completed in a short time to reduce an increase of a terminal-to-terminal voltage of a capacitor and thereby prevent the terminal-to-terminal voltage of the capacitor from exceeding an upper limit voltage.

6 Claims, 18 Drawing Sheets

(58) Field of Classification Search
USPC ........ 307/66, 64, 65, 23; 713/300, 340, 320; 363/37, 132
See application file for complete search history.

(56) References Cited

FOREIGN PATENT DOCUMENTS

| | | | |
|---|---|---|---|
| JP | 6533357 | B1 | 6/2019 |
| WO | WO 2015/198448 | A1 | 12/2015 |
| WO | WO 2017/017719 | A1 | 2/2017 |
| WO | WO 2018/163397 | A1 | 9/2018 |

OTHER PUBLICATIONS

Written Opinion of the International Search Report issued Apr. 20, 2021, in PCT/JP2021/003267 (with English Translation), 8 pages.

* cited by examiner

FIG.6
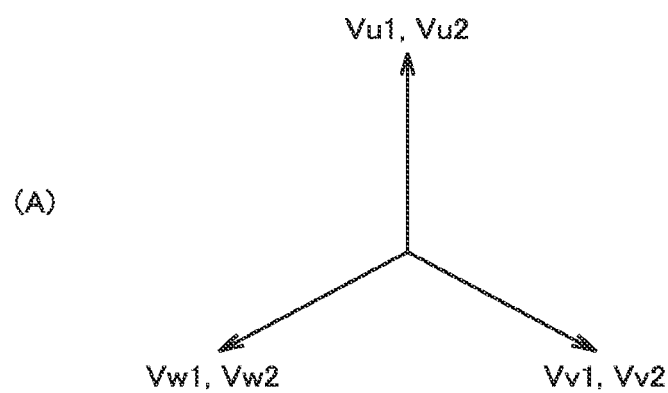
(A)
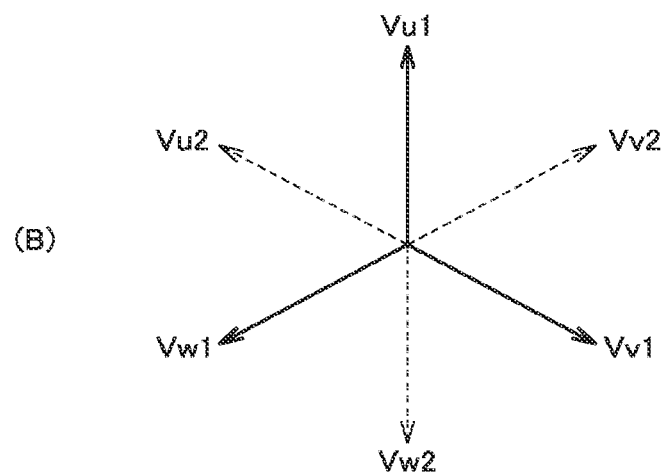
(B)
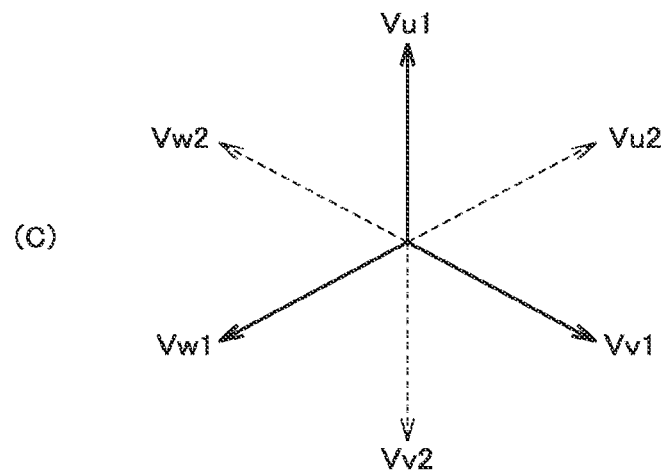
(C)

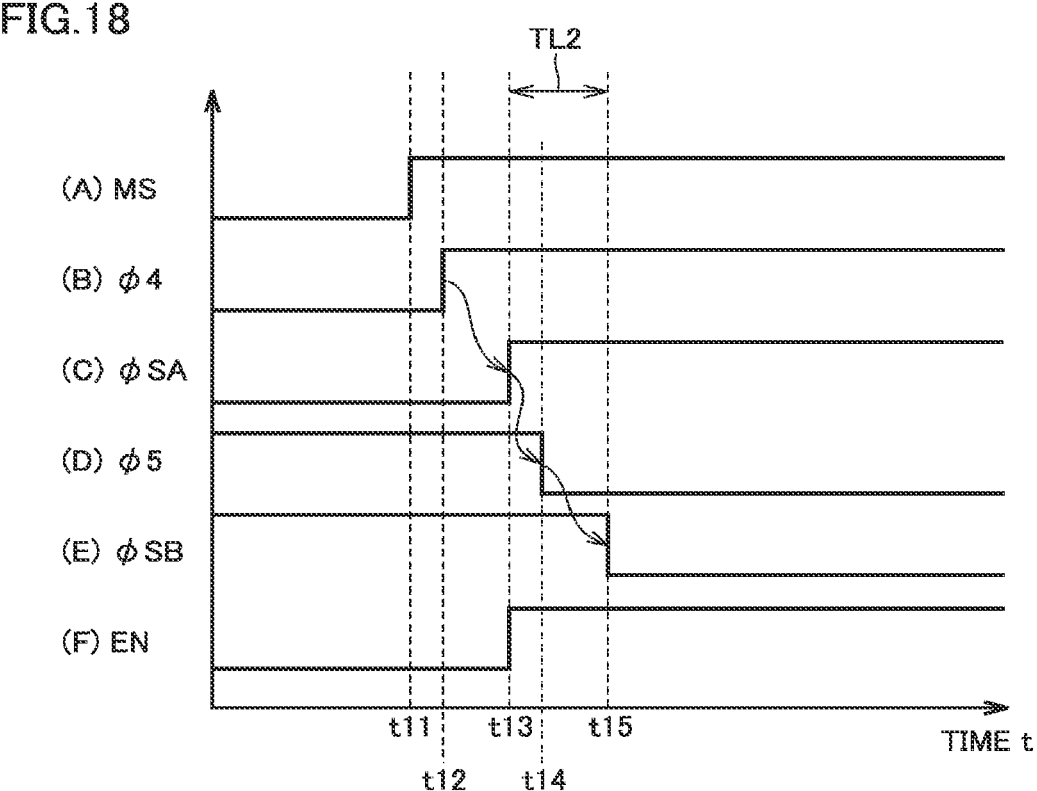

UNINTERRUPTIBLE POWER SUPPLY APPARATUS

TECHNICAL FIELD

The present invention relates to an uninterruptible power supply apparatus, and more particularly to an uninterruptible power supply apparatus having a bypass power feed mode in which AC power is supplied from a bypass AC power supply to a load, an inverter power feed mode in which AC power is supplied from an inverter to the load, and a lap power feed mode in which AC power is supplied from both of the bypass AC power supply and the inverter to the load.

BACKGROUND ART

For example, Japanese Patent No. 6533357 (PTL 1) discloses an uninterruptible power supply apparatus having the bypass power feed mode, the inverter power feed mode, and the lap power feed mode. This uninterruptible power supply apparatus includes a first switch having one terminal receiving a first AC voltage supplied from a bypass AC power supply and the other terminal connected to a load, a rectifier that converts a second AC voltage supplied from a commercial AC power supply to a DC voltage, a capacitor that smooths the DC output voltage from the rectifier, an inverter that converts a terminal-to-terminal voltage of the capacitor to a third AC voltage, a second switch having one terminal receiving the third AC voltage and the other terminal connected to a load, and a controller.

In the bypass power feed mode, the controller turns on the first switch and turns off the second switch. In the inverter power feed mode, the controller turns off the first switch and turns on the second switch. Further, in the lap power feed mode, the controller turns on both the first and second switches. The lap power feed mode is performed in a switching period in which any one power feed mode of the bypass power feed mode and the inverter power feed mode is switched to the other power feed mode.

CITATION LIST

Patent Literature

PTL 1: Japanese Patent No. 6533357

SUMMARY OF INVENTION

Technical Problem

Generally, in such an uninterruptible power supply apparatus, AC current including a feedback component having a value corresponding to a deviation between a reference voltage and a terminal-to-terminal voltage of a capacitor is passed from a commercial AC power supply to a rectifier, to thereby maintain the terminal-to-terminal voltage of the capacitor at the reference voltage. In this method, the feedback component needs to be controlled at a high speed in order to maintain the terminal-to-terminal voltage of the capacitor at the reference voltage even when load current changes suddenly. The high-speed control of the feedback component, however, results in unstable control.

To solve this problem, a method may be employed in which AC current including a feedback component and a feedforward component having a value corresponding to the load current is passed from the commercial AC power supply to the rectifier, to thereby maintain the terminal-to-terminal voltage of the capacitor at the reference voltage. According to this method, the control can be stabilized by low-speed control of the feedback component, and a sudden change in load current can be addressed by introduction of the feedforward component.

In this method, however, when the load current is supplied from both of the bypass AC power supply and the inverter in the lap power feed mode, the output from the rectifier becomes greater than the output from the inverter, causing an increase in the terminal-to-terminal voltage of the capacitor. When the terminal-to-terminal voltage of the capacitor exceeds an upper limit voltage in a switching period in which the bypass power feed mode is switched to the inverter power feed mode, the operation of the inverter is stopped and thus the operation of the load is stopped.

A main object of the present invention is therefore to provide an uninterruptible power supply apparatus capable of reducing an increase of the terminal-to-terminal voltage of the capacitor in a switching period in which a first mode is switched to a second mode.

Solution to Problem

An uninterruptible power supply apparatus according to the present invention includes a first electromagnetic contactor, a semiconductor switch, a rectifier, a capacitor, an inverter, a second electromagnetic contactor, and a controller. The first electromagnetic contactor has a first terminal receiving a first AC voltage supplied from a first AC power supply, and a second terminal connected to a load. The semiconductor switch is connected in parallel with the first electromagnetic contactor. The rectifier converts a second AC voltage supplied from a second AC power supply to a DC voltage. The capacitor smooths the DC voltage output from the rectifier. The inverter converts a terminal-to-terminal voltage of the capacitor to a third AC voltage. The second electromagnetic contactor has a first terminal receiving the third AC voltage, and a second terminal connected to the load. The controller controls the uninterruptible power supply apparatus.

In a first mode in which the first AC voltage is supplied to the load, the controller turns on the first electromagnetic contactor and turns off the semiconductor switch and the second electromagnetic contactor. In a second mode in which the third AC voltage is supplied to the load, the controller turns off the first electromagnetic contactor and the semiconductor switch and turns on the second electromagnetic contactor. Further, in a switching period in which the first mode is switched to the second mode, the controller turns on the semiconductor switch and the second electromagnetic contactor, turns off the first electromagnetic contactor, activates the inverter, and thereafter turns off the semiconductor switch.

Advantageous Effects of Invention

In the uninterruptible power supply apparatus according to the present invention, in a switching period in which the first mode is switched to the second mode, the semiconductor switch and the second electromagnetic contactor are turned on, the first electromagnetic contactor is turned off and, in this state, the inverter is activated to start the lap power feed mode, and the semiconductor switch is turned off to end the lap power feed mode. The lap power feed mode can thus be ended in a short time, which enables reduction of an increase of the terminal-to-terminal voltage of the capacitor and thereby enables prevention of the terminal-to-terminal voltage of the capacitor from exceeding an upper limit voltage.

BRIEF DESCRIPTION OF DRAWINGS

FIG. 6 shows a relation between a three-phase AC voltage of the commercial AC power supply shown in FIG. 4 and a three-phase AC voltage of the bypass AC power supply shown in FIG. 5.

FIG. 18 is a time chart showing the comparative example of the embodiment.

DESCRIPTION OF EMBODIMENTS

Figure 1:
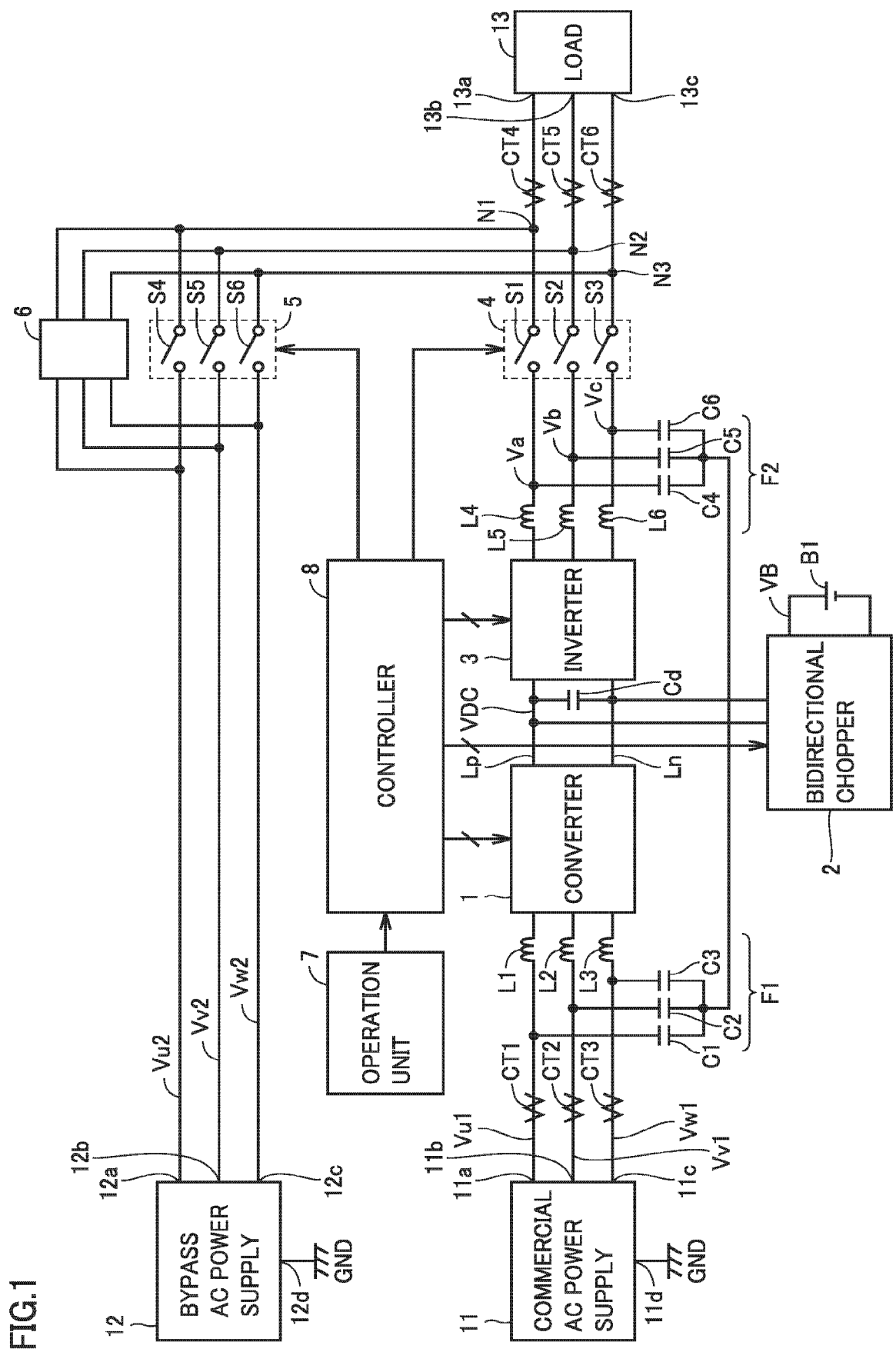
FIG. 1 is a circuit block diagram showing a configuration of an uninterruptible power supply apparatus according to one embodiment of the present invention.

FIG. 1 is a circuit block diagram showing a configuration of an uninterruptible power supply apparatus according to one embodiment of the present invention. In FIG. 1, this uninterruptible power supply apparatus includes capacitors C1 to C6 and Cd, reactors L1 to L6, current detectors CT1 to CT6, a converter 1, a DC positive bus Lp, a DC negative bus Ln, a bidirectional chopper 2, an inverter 3, electromagnetic contactors 4, 5, a semiconductor switch 6, an operation unit 7, and a controller 8.

This uninterruptible power supply apparatus receives three-phase AC power with a commercial frequency from a commercial AC power supply 11 and a bypass AC power supply 12 and supplies three-phase AC power with a commercial frequency to a load 13. Commercial AC power supply 11 (second AC power supply) outputs three-phase AC voltages Vu1, Vv1, and Vw1 (second AC voltage) to AC output terminals 11a to 11c, respectively. A neutral point terminal 11d of commercial AC power supply 11 receives ground voltage GND.

Instantaneous values of three-phase AC voltages Vu1, Vv1, and Vw1 are detected by controller 8. Controller 8 detects whether a power failure of commercial AC power supply 11 has occurred, based on AC output voltages Vu1, Vv1, and Vw1 of commercial AC power supply 11.

Bypass AC power supply 12 (first AC power supply) outputs three-phase AC voltages Vu2, Vv2, and Vw2 (first AC voltage) to AC output terminals 12a to 12c, respectively. A neutral point terminal 12d of bypass AC power supply 12 receives ground voltage GND. Bypass AC power supply 12 is a private power generator. Instantaneous values of three-phase AC voltages Vu2, Vv2, and Vw2 are detected by controller 8. AC input terminals 13a to 13c of load 13 receive a three-phase AC voltage from the uninterruptible power supply apparatus. Load 13 is driven by three-phase AC power supplied from the uninterruptible power supply apparatus.

Capacitors C1 to C3 have respective first electrodes connected respectively to AC output terminals 11a to 11c of commercial AC power supply 11, and respective second electrodes connected to each other. Reactors L1 to L3 have respective first terminals connected respectively to AC output terminals 11a to 11c of commercial AC power supply 11, and respective second terminals connected to respective three input nodes of converter 1.

Capacitors C1 to C3 and reactors L1 to L3 constitute an AC filter F1. AC filter F1 is a low pass filter, allows AC current with a commercial frequency to flow from commercial AC power supply 11 to converter 1, and prevents a signal with a switching frequency from flowing from converter 1 to commercial AC power supply 11. Current detectors CT1 to CT3 detect AC currents I1 to I3 flowing through reactors L1 to L3, respectively, and apply a signal indicating a detected value to controller 8.

The positive-side output node of converter 1 is connected to the positive-side input node of inverter 3 through DC positive bus Lp. The negative-side output node of converter 1 is connected to the negative-side input node of inverter 3 through DC negative bus Ln. Capacitor Cd is connected between buses Lp and Ln and smooths DC voltage VDC between buses Lp and Ln. An instantaneous value of DC voltage VDC is detected by controller 8.

Converter 1 is controlled by controller 8 and converts three-phase AC power from commercial AC power supply 11 to DC power when three-phase AC power is supplied normally from commercial AC power supply 11 (in a sound state of commercial AC power supply 11). DC power generated by converter 1 is supplied to bidirectional chopper 2 and inverter 3 through buses Lp and Ln.

When supply of three-phase AC power from commercial AC power supply 11 is stopped (at the time of a power failure of commercial AC power supply 11), the operation of converter 1 is stopped. AC filter F1 and converter 1 correspond to an embodiment of "rectifier" that converts three-phase AC power from commercial AC power supply 11 to DC power. Current detectors CT1 to CT3 correspond to an embodiment of "first current detector" that detects AC current flowing from commercial AC power supply 11 to the rectifier.

Bidirectional chopper 2 is controlled by controller 8, stores DC power generated by converter 1 in battery B1 in a sound state of commercial AC power supply 11, and supplies DC power in battery B1 to inverter 3 through buses Lp and Ln in response to occurrence of a power failure of commercial AC power supply 11. An instantaneous value of terminal-to-terminal voltage VB of battery B1 is detected by controller 8.

Inverter 3 is controlled by controller 8 and converts DC power supplied from converter 1 and bidirectional chopper 2 to three-phase AC power with a commercial frequency. Electromagnetic contactor 4 includes three switches S1 to S3. Three switches S1 to S3 are controlled by controller 8 and turned on and off simultaneously. Electromagnetic contactor 4 corresponds to an embodiment of "second electromagnetic contactor."

Inverter 3 has three output nodes connected to respective first terminals of reactors L4 to L6. Reactor L4 to L6 have respective second terminals connected to respective first terminals of switches S1 to S3, respectively, and switches S1 to S3 have respective second terminals (nodes N1 to N3) connected respectively to three AC input terminals 13a to 13c of load 13. Capacitors C4 to C6 have respective first electrodes connected to respective second terminals of reactors L4 to L6, respectively, and capacitors C4 to C6 have respective second electrodes connected together to respective second electrodes of capacitors C1 to C3.

Capacitors C4 to C6 and reactors L4 to L6 constitute an AC filter F2. AC filter F2 is a low pass filter, allows AC current with a commercial frequency to flow from inverter 3 to load 13, and prevents a signal with a switching frequency from flowing from inverter 3 to load 13. In other words, AC filter F2 converts three-phase rectangular wave voltage output from inverter 3 to sinusoidal three-phase AC voltages Va, Vb, and Vc.

Inverter 3 and AC filter F2 correspond to an embodiment of "inverter" that converts terminal-to-terminal voltage VDC of capacitor Cd to three-phase AC voltages Va to Vc. Instantaneous values of three-phase AC voltages Va to Vc are detected by controller 8.

Electromagnetic contactor 5 includes three switches S4 to S6. Three switches S4 to S6 are controlled by controller 8 and turned on and off simultaneously. Switches S4 to S6 have respective first terminals connected to AC output terminals 12a to 12c respectively of bypass AC power supply 12, and respective second terminals connected to respective second terminals (nodes N1 to N3) of switches S1 to S3 respectively. Electromagnetic contactor 5 corresponds to an embodiment of "first electromagnetic contactor."

Figure 2:
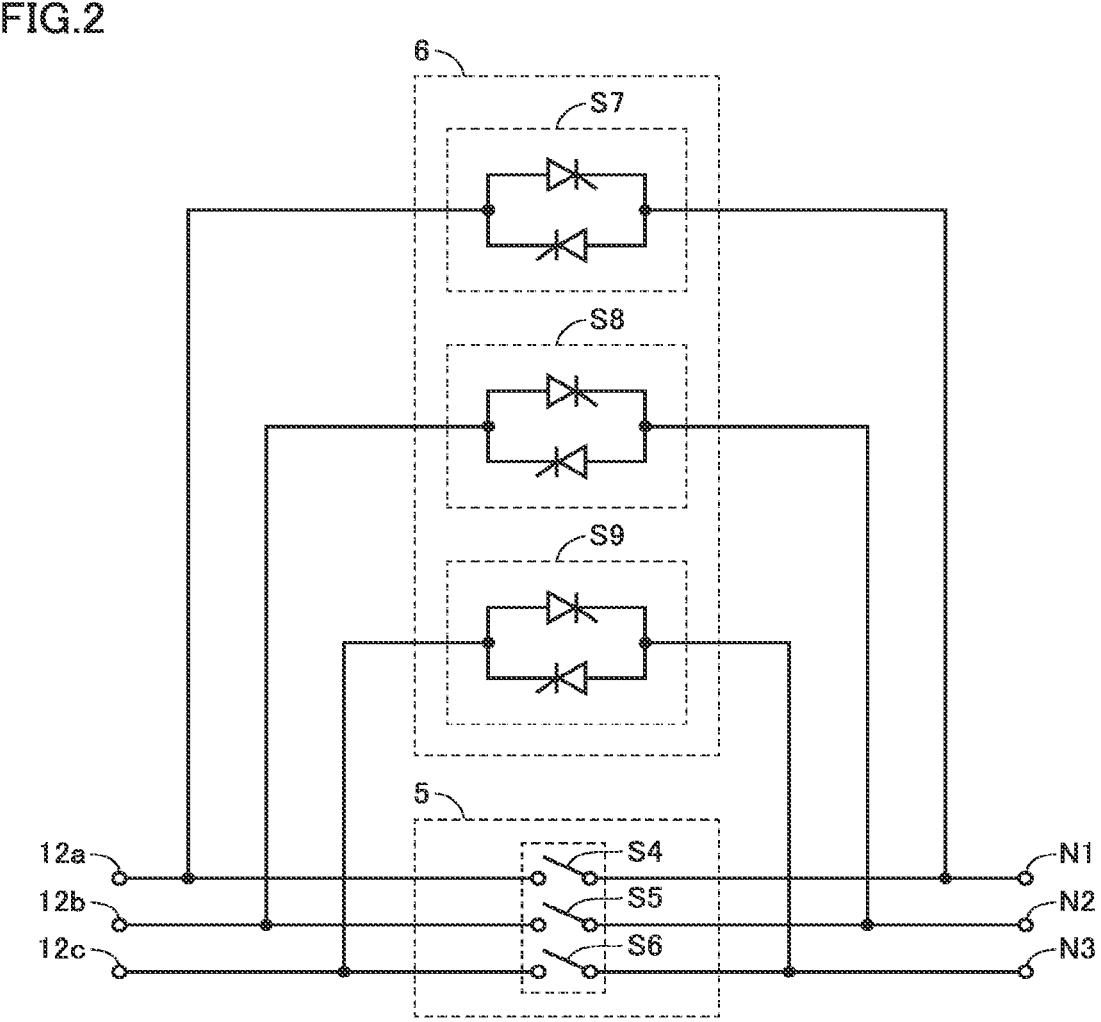
FIG. 2 is a circuit diagram showing a configuration of a semiconductor switch shown in FIG. 1.

FIG. 2 is a circuit diagram showing a configuration of semiconductor switch 6. In FIG. 2, semiconductor switch 6 includes three thyristor switches S7 to S9. Thyristor switches S7 to S9 are connected in parallel with switches S4 to S6 of electromagnetic contactor 5, respectively. Each of thyristor switches S7 to S9 includes a pair of thyristors connected in anti-parallel with each other. Thyristor switches S7 to S9 are controlled by controller 8 and turned on and off simultaneously. Semiconductor switch 6 corresponds to an embodiment of "semiconductor switch."

While electromagnetic contactors 4, 5 have an advantage that the electromagnetic contactors are inexpensive even when they have a large rated current, the electromagnetic contactors have a disadvantage that their response time is long (approximately 100 msec). In contrast, while semiconductor switch 6 has an advantage that its response time is short (10 msec or less), the semiconductor switch has a disadvantage that the semiconductor switch having a large rated current is expensive.

Therefore, for an uninterruptible power supply apparatus, generally both electromagnetic contactors 4, 5 having a large rated current and semiconductor switch 6 having a small rated current are used. Electromagnetic contactors 4, 5 are used for allowing load current to flow for a long time, and semiconductor switch 6 is used for allowing load current to flow only for a short time. Even semiconductor switch 6 having a small rated current allows load current to flow for a time as long as the time is a short period of time.

Referring again to FIG. 1, current detector CT4 detects AC current I4 flowing between node N1 and AC input terminal 13a of load 13, and applies a signal indicating a detected value to controller 8. Current detector CT5 detects AC current I5 flowing between node N2 and AC input terminal 13b of load 13, and applies a signal indicating a detected value to controller 8. Current detector CT6 detects AC current I6 flowing between node N3 and AC input terminal 13c of load 13, and applies a signal indicating a detected value to controller 8. Current detectors CT4 to CT6 correspond to an embodiment of "second current detector" that detects load currents I4 to I6.

Operation unit 7 includes a plurality of buttons operated by a user of the uninterruptible power supply apparatus, and an image display unit presenting a variety of information, for example. The user can operate operation unit 7 to power on and off the uninterruptible power supply apparatus and select any one mode from the bypass power feed mode and the inverter power feed mode.

Controller 8 controls the entire uninterruptible power supply apparatus based on a signal from operation unit 7, AC output voltages Vu1, Vv1, and Vw1 of commercial AC power supply 11, AC input currents I1 to I3, terminal-to-terminal voltage VDC of capacitor Cd, terminal-to-terminal voltage VB of battery B1, load currents I4 to I6, AC output voltages Va to Vc of inverter 3, and AC output voltages Vu2, Vv2, and Vw2 of bypass AC power supply 12, and the like.

Specifically, in the bypass power feed mode (first mode) in which three-phase AC power is supplied from bypass AC power supply 12 to load 13, controller 8 inactivates inverter 3, turns off electromagnetic contactor 4 (i.e., switches S1 to S3) and semiconductor switch 6 (i.e., thyristor switches S7 to S8), and turns on electromagnetic contactor 5 (i.e., switches S4 to S6). In this case, three-phase AC power is supplied from bypass AC power supply 12 to load 13 through electromagnetic contactor 5.

In the inverter power feed mode (second mode) in which three-phase AC power generated by inverter 3 is supplied to load 13, controller 8 activates inverter 3, turns on electromagnetic contactor 4, and turns off electromagnetic contactor 5 and semiconductor switch 6. In this case, three-phase AC power is supplied from inverter 3 to load 13 through AC filter F2 and electromagnetic contactor 4.

When a fault of inverter 3 occurs in the inverter power feed mode, controller 8 turns on semiconductor switch 6 and electromagnetic contactor 5, turns off electromagnetic contactor 4, and thereafter turns off semiconductor switch 6.

In this case, upon the occurrence of a fault of inverter 3, semiconductor switch 6 having a short response time is instantaneously turned on to cause three-phase AC power to be supplied from bypass AC power supply 12 to load 13 through semiconductor switch 6. Subsequently, electromagnetic contactor 5 having a long response time is turned on to cause three-phase AC power to be supplied from bypass AC power supply 12 to load 13 through electromagnetic contactor 5 and semiconductor switch 6 that are connected in parallel with each other.

When electromagnetic contactor 5 is turned on, semiconductor switch 6 is turned off to cause three-phase AC power to be supplied from bypass AC power supply 12 to load 13 through electromagnetic contactor 5. Semiconductor switch 6 is caused to be off for only a short time, in order to prevent breakage of semiconductor switch 6 due to heat generation by semiconductor switch 6 resulting from flow of load current through semiconductor switch 6.

In a switching period in which the bypass power feed mode is switched to the inverter power feed mode, controller 8 turns on semiconductor switch 6 and electromagnetic contactor 4, turns off electromagnetic contactor 5, activates inverter 3, and thereafter turns off semiconductor switch 6.

When inverter 3 is activated, three-phase AC power is supplied from inverter 3 to load 13 through AC filter F2 and electromagnetic contactor 4, and three-phase AC power is supplied from bypass AC power supply 12 to load 13 through semiconductor switch 6, so that the lap power feed mode is performed. When semiconductor switch 6 is turned off, power feed from bypass AC power supply 12 is stopped (i.e., the lap power feed mode is stopped), so that the inverter power feed mode is performed.

Accordingly, the time for the lap power feed mode can be shortened relative to the conventional one, and an increase of terminal-to-terminal voltage VDC of capacitor Cd in the switching period can be reduced. This is detailed later herein.

In a switching period in which the inverter power feed mode is switched to the bypass power feed mode, controller 8 turns on electromagnetic contactor 5, turns off electromagnetic contactor 4, and thereafter inactivates inverter 3.

When electromagnetic contactor 5 is turned on, three-phase AC power is supplied from inverter 3 to load 13 through AC filter F2 and electromagnetic contactor 4, and three-phase AC power is supplied from bypass AC power supply 12 to load 13 through electromagnetic contactor 5, so that the lap power feed mode is performed. When electromagnetic contactor 4 is turned off, power feed from inverter 3 is stopped (i.e., the lap power feed mode is stopped), so that the bypass power feed mode is performed.

In this case, even when terminal-to-terminal voltage VDC of capacitor Cd is increased in the lap power feed mode to exceed upper limit voltage VDCH and thereby cause stoppage of the operation of inverter 3, there arises no problem because power feed from bypass AC power supply 12 to load 13 is continued.

Further, controller 8 controls converter 1 based on AC input currents I1 to I3, terminal-to-terminal voltage VDC of capacitor Cd, load currents I4 to I6, and the like. In the inverter power feed mode and the bypass power feed mode, controller 8 passes three-phase AC currents I1 to I3, which include feedback component IFB having a value corresponding to deviation $\Delta VDC=VDCr1-VDC$ between reference voltage VDCr1 and terminal-to-terminal voltage VDC of capacitor Cd, and feedforward component IFF obtained by multiplying load currents I4 to I6 by gain Kf (1.0 for example), from commercial AC power supply 11 to converter 1, such that terminal-to-terminal voltage VDC of capacitor Cd becomes reference voltage VDCr1 (first reference voltage).

Three-phase AC currents I1 to I3 including feedforward component IFF obtained by multiplying load currents I4 to I6 by gain Kf are passed to converter 1, in order to increase the response speed of converter 1 to fluctuation in load currents I4 to I6. Introduction of this feedforward component IFF enables low-speed control of feedback component IFB and thereby enable stabilization of control.

In a switching period in which any one mode of the inverter power feed mode and the bypass power feed mode is switched to the other mode, controller 8 passes three-phase AC currents I1 to I3, which include feedback component IFB having a value corresponding to deviation $\Delta VDC=VDCr2-VDC$ between reference voltage VDCr2 and terminal-to-terminal voltage VDC of capacitor Cd, and feedforward component IFF obtained by multiplying load currents I4 to I6 by gain Kf, from commercial AC power supply 11 to converter 1, such that terminal-to-terminal voltage VDC of capacitor Cd becomes reference voltage VDCr2 (second reference voltage) higher than reference voltage VDCr1.

Converter 1 is controlled such that terminal-to-terminal voltage VDC of capacitor Cd becomes reference voltage VDCr2 higher than reference voltage VDCr1 in the switching period, in order to prevent circulating current from flowing between commercial AC power supply 11 and bypass AC power supply 12.

Reference voltage VDCr1 is set to a voltage lower than a voltage twice the peak values of three-phase AC voltages Vu1, Vv1, Vw1 of commercial AC power supply 11. Reference voltage VDCr2 is set to a voltage equal to or higher than the voltage twice the peak values of three-phase AC voltages Vu1, Vv1, Vw1 of commercial AC power supply 11. The relation between reference voltages VDCr1, VDCr2 and the circulating current is detailed later herein (FIGS. 3 to 8).

Controller 8 controls bidirectional chopper 2 such that terminal-to-terminal voltage VB of battery B1 becomes reference voltage VBr in a sound state of commercial AC power supply 11, and controls bidirectional chopper 2 such that terminal-to-terminal voltage VDC of capacitor Cd becomes reference voltage VDCr1 at the time of a power failure of commercial AC power supply 11. Further, controller 8 controls inverter 3 such that AC output voltages Va to Vc of inverter 3 are synchronized with AC output voltages Vu2, Vv2, and Vw2 of bypass AC power supply 12.

A reason why terminal-to-terminal voltage VDC of capacitor Cd increases in the lap power feed mode in such an uninterruptible power supply apparatus, and means for reducing the increase of this DC voltage VDC are now detailed.

When power is supplied from both inverter 3 and bypass AC power supply 12 to load 13 in the lap power feed mode, the load on bypass AC power supply 12, which is a private power generator, suddenly changes to cause fluctuation of the frequency and/or the phase of output voltages Vu2, Vv2, and Vw2 of bypass AC power supply 12.

When fluctuation of the frequency and/or the phase of output voltages Vu2, Vv2, and Vw2 of bypass AC power supply 12 occurs, circulating current IC flows from one of commercial AC power supply 11 and bypass AC power supply 12 to the other through capacitor Cd, and this circulating current IC charges capacitor Cd to cause DC voltage VDC to increase.

In the present embodiment, this is addressed by setting reference voltage VDCr2 in the switching period of the bypass power feed mode and the inverter power feed mode to a voltage higher than reference voltage VDCr1 in the bypass power feed mode and the inverter power feed mode, to thereby reduce circulating current IC.

When feedforward component IFF obtained by multiplying load currents I4 to I6 by gain Kf is passed to converter 1 in the lap power feed mode, the input current to converter 1 becomes larger than the output current from inverter 3, resulting in an increase of DC voltage VDC. The longer the time for which the lap power feed mode is performed, the larger the increase of DC voltage VDC.

In the present embodiment, this is addressed by turning on semiconductor switch 6 and electromagnetic contactor 4, turning off electromagnetic contactor 5, activating inverter 3, and thereafter turning off semiconductor switch 6, to thereby shorten the time for the lap power feed mode and reduce the increase of DC voltage VDC.

Figure 3:
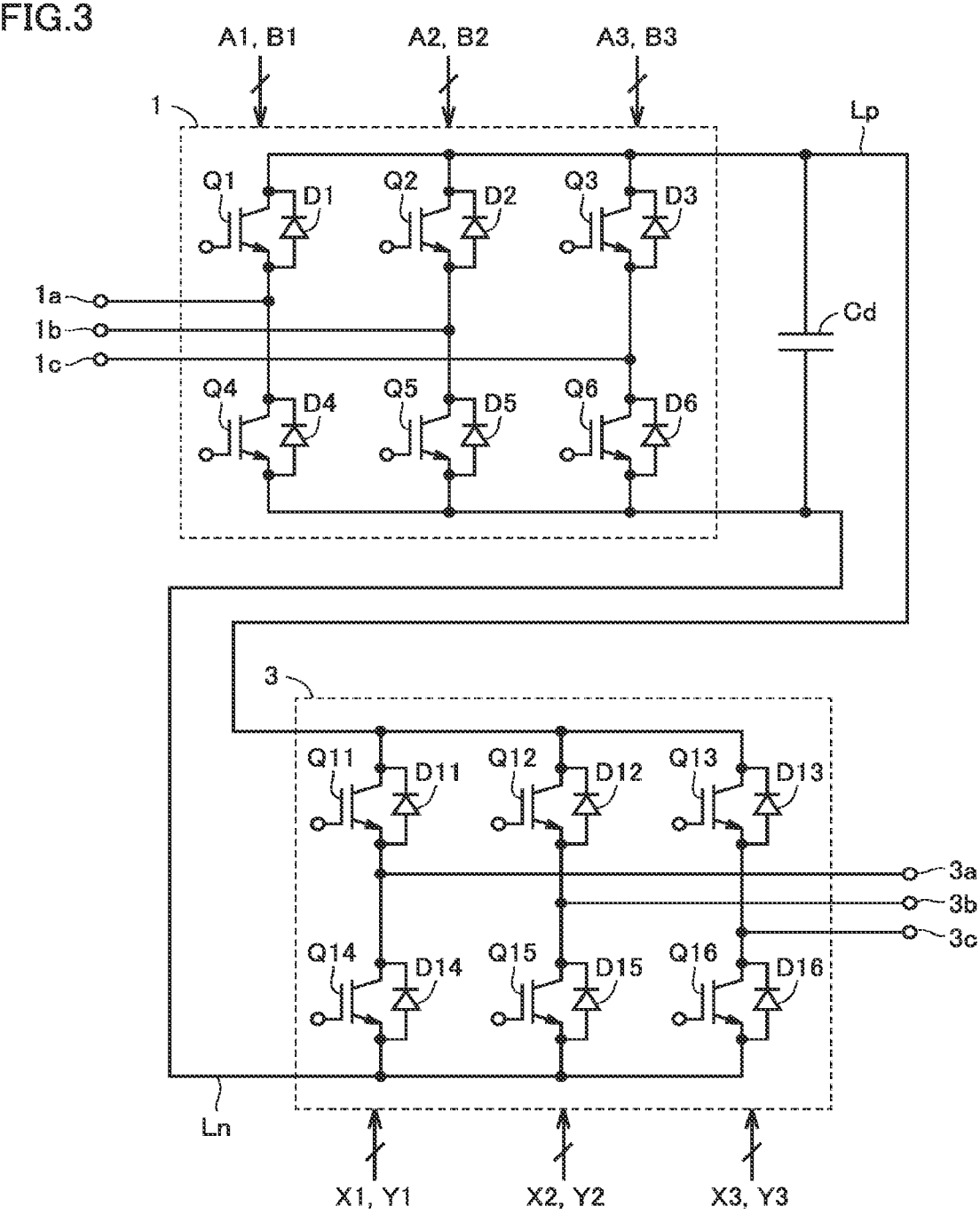
FIG. 3 is a circuit diagram showing a configuration of a converter and an inverter shown in FIG. 1.

A reason why circulating current IC flows in the lap power feed mode, and means for addressing this are now described in detail. FIG. 3 is a circuit diagram showing a configuration of converter 1 and inverter 3. In FIG. 3, converter 1 includes IGBTs (Insulated Gate Bipolar Transistors) Q1 to Q6 and diodes D1 to D6. The IGBTs constitute a switching element. The collectors of IGBTs Q1 to Q3 are connected together to DC positive bus Lp, and the emitters thereof are respectively connected to input nodes 1a, 1b, and 1c.

Input nodes 1a, 1b, and 1c are respectively connected to the other terminals of reactors L1 to L3 (FIG. 1). The collectors of IGBTs Q4 to Q6 are respectively connected to input nodes 1a, 1b, and 1c, and the emitters thereof are connected together to DC negative bus Ln. Diodes D1 to D6 are respectively connected in anti-parallel with IGBTs Q1 to Q6.

IGBTs Q1 and Q4 are respectively controlled by gate signals A1 and B1, IGBTs Q2 and Q5 are respectively controlled by gate signals A2 and B2, and IGBTs Q3 and Q6 are respectively controlled by gate signals A3 and B3. Gate signals B1, B2, and B3 are inversion signals of gate signals A1, A2, and A3, respectively.

IGBTs Q1 to Q3 turn on when gate signals A1, A2, and A3 are brought to "H" level, respectively, and turn off when gate signals A1, A2, and A3 are brought to "L" level, respectively. IGBTs Q4 to Q6 turn on when gate signals B1, B2, and B3 are brought to "H" level, respectively, and turn off when gate signals B1, B2, and B3 are brought to "L" level, respectively.

Each of gate signals A1, B1, A2, B2, A3, and B3 is a pulse signal train and a PWM (Pulse Width Modulation) signal. The phase of gate signals A1, B1, the phase of gate signals A2, B2, and the phase of gate signals A3, B3 are basically shifted from each other by 120 degrees. Gate signals A1, B1, A2, B2, A3, and B3 are generated by controller 8.

Each of IGBTs Q1 to Q6 is turned on and off at a predetermined timing by gate signals A1, B1, A2, B2, A3, and B3, and the ON time of each of IGBTs Q1 to Q6 is adjusted, whereby three-phase AC voltage applied to input nodes 6a to 6c can be converted to a desired DC voltage VDC (terminal-to-terminal voltage of capacitor Cd).

Inverter 3 includes IGBTs Q11 to Q16 and diodes D11 to D16. The IGBTs constitute a switching element. The collectors of IGBTs Q11 to Q13 are connected together to DC positive bus Lp, and the emitters thereof are respectively connected to output nodes 3a, 3b, and 3c. Each of output nodes 3a, 3b, and 3c is connected to the first terminal of the corresponding one of reactors L4 to L6 (FIG. 1). The collectors of IGBTs Q14 to Q16 are respectively connected to output nodes 3a, 3b, and 3c, and the emitters thereof are connected together to DC negative bus Ln. Diodes D11 to D16 are respectively connected in anti-parallel with IGBTs Q11 to Q16.

IGBTs Q11 and Q14 are respectively controlled by gate signals X1 and Y1, IGBTs Q12 and Q15 are respectively controlled by gate signals X2 and Y2, and IGBTs Q13 and Q16 are respectively controlled by gate signals X3 and Y3. Gate signals Y1, Y2, and Y3 are inversion signals of gate signals X1, X2, and X3, respectively.

IGBTs Q11 to Q13 turn on when gate signals X1, X2, and X3 are brought to "H" level, respectively, and turn off when gate signals X1, X2, and X3 are brought to "L" level, respectively. IGBTs Q14 to Q16 turn on when gate signals Y1, Y2, and Y3 are brought to "H" level, respectively, and turn off when gate signals Y1, Y2, and Y3 are brought to "L" level, respectively.

Each of gate signals X1, Y2, X3, Y1, X2, and Y3 is a pulse signal train and a PWM signal. The phase of gate signals X1, Y1, the phase of gate signals X2, Y2, and the phase of gate signals X3, Y3 are basically shifted from each other by 120 degrees. Gate signals X1, Y1, X2, Y2, X3, and Y3 are generated by controller 8.

For example, when IGBTs Q11 and Q15 turn on, DC positive bus Lp is connected to output node 3a through IGBT Q11, output node 3b is connected to DC negative bus Ln through IGBT Q15, and a positive voltage is output between output nodes 3a and 3b.

When IGBTs Q12 and Q14 turn on, DC positive bus Lp is connected to output node 3b through IGBT Q12, output node 3a is connected to DC negative bus Ln through IGBT Q14, and a negative voltage is output between output nodes 3a and 3b.

Each of IGBTs Q11 to Q16 is turned on and off at a predetermined timing by gate signals X1, Y1, X2, Y2, X3, and Y3, and the ON time of each of IGBTs Q11 to Q16 is adjusted, whereby DC voltage VDC between buses Lp and Ln can be converted to three-phase AC voltages Va, Vb, and Vc.

Figure 4:
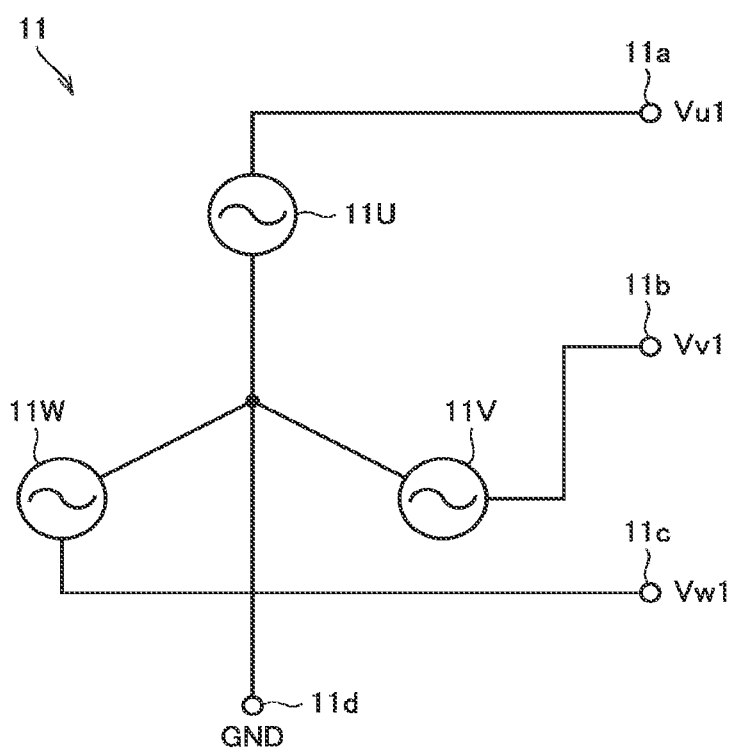
FIG. 4 is an equivalent circuit diagram showing a configuration of a commercial AC power supply shown in FIG. 1.

FIG. 4 is an equivalent circuit diagram showing a configuration of commercial AC power supply 11. In FIG. 4, commercial AC power supply 11 includes three-phase AC power supplies 11U, 11V, and 11W star-connected (Y-connected) to neutral point terminal 11d. AC power supply 11U is connected between AC output terminal 11a and neutral point terminal 11d and outputs AC voltage Vu1 to AC output terminal 11a. AC power supply 11V is connected between AC output terminal 11b and neutral point terminal 11d and outputs AC voltage Vv1 to AC output terminal 11b. AC power supply 11W is connected between AC output terminal 11c and neutral point terminal 11d and outputs AC voltage Vw1 to AC output terminal 11c.

Each of AC voltages Vu1, Vv1, and Vw1 changes sinusoidally at a commercial frequency (for example, 60 Hz). The peak values (·2 times the effective value) of AC voltages Vu1, Vv1, and Vw1 are the same, and the phases thereof are shifted from each other by 120 degrees. AC power supplies 11U, 11V, and 11W correspond to, for example, three-phase windings at the last stage included in a three-phase transformer at the last stage of commercial AC power supply 11.

Figure 5:
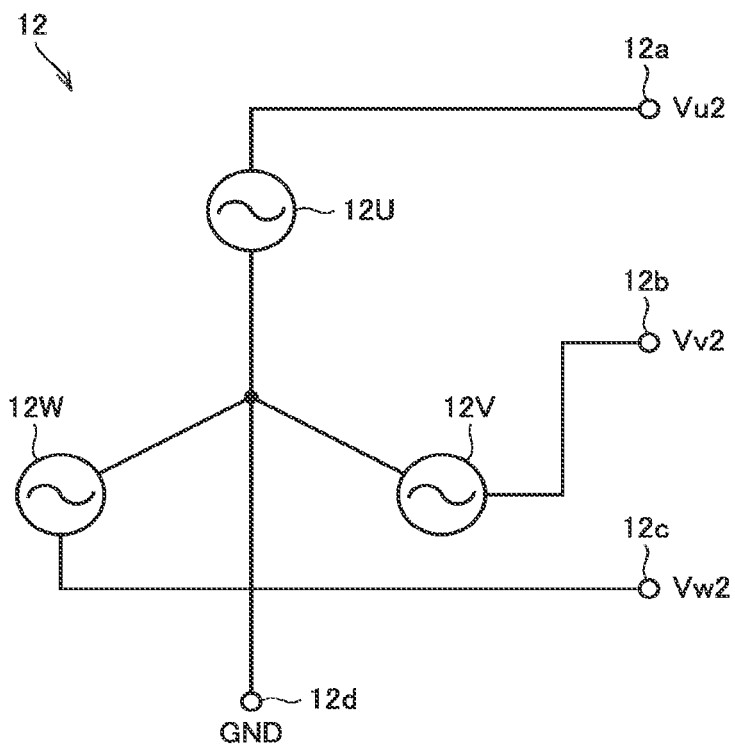
FIG. 5 is an equivalent circuit diagram showing a configuration of a bypass AC power supply shown in FIG. 1.

FIG. 5 is an equivalent circuit diagram showing a configuration of bypass AC power supply 12. In FIG. 5, bypass AC power supply 12 includes three-phase AC power supplies 12U, 12V, and 12W star-connected to neutral point terminal 12d. AC power supply 12U is connected between AC output terminal 12a and neutral point terminal 12d and outputs AC voltage Vu2 to AC output terminal 12a. AC power supply 12V is connected between AC output terminal 12b and neutral point terminal 12d and outputs AC voltage Vv2 to AC output terminal 12b. AC power supply 12W is connected between AC output terminal 12c and neutral point terminal 12d and outputs AC voltage Vw2 to AC output terminal 12c.

Each of AC voltages Vu2, Vv2, and Vw2 changes sinusoidally at a commercial frequency. The peak values of AC voltages Vu2, Vv2, Vw2 are the same, and the phases thereof are shifted from each other by 120 degrees. AC power supplies 12U, 12V, and 12W correspond to, for example, a three-phase coil of a private power generator.

In the inverter power feed mode and the bypass power feed mode, the phases (and the peak values) of AC voltages Vu2, Vv2, and Vw2 of bypass AC power supply 12 match the phases (and the peak values) of AC voltages Vu1, Vv1, and Vw1 of commercial AC power supply 11, respectively. In this state, no circulating current IC flows through the uninterruptible power supply apparatus.

However, in the lap power feed mode in which AC power is supplied to load 13 from both inverter 3 and bypass AC power supply 12, the load current of bypass AC power supply 12 significantly fluctuates, and the phases and the peak values of AC voltages Vu2, Vv2, and Vw2 fluctuate. AC voltages Vu2, Vv2, and Vw2 then do not match AC voltages Vu1, Vv1, and Vw1, respectively.

FIGS. 6(A) to 6(C) show the relation between AC voltages Vu1, Vv1, and Vw1 of commercial AC power supply 11 and AC voltages Vu2, Vv2, and Vw2 of bypass AC power supply 12. Each of AC voltages Vu1, Vv1, Vw1, Vu2, Vv2, and Vw2 is illustrated by a vector. AC voltages Vu1, Vv1, and Vw1 are out of phase by 120 degrees, and AC voltages Vu2, Vv2, and Vw2 are out of phase by 120 degrees. FIG. 6(A) shows a case where the phases of AC voltages Vu2, Vv2, and Vw2 match the phases of AC voltages Vu1, Vv1, and Vw1, respectively.

FIG. 6(B) shows a case where the phases of AC voltages Vu2, Vv2, and Vw2 lag behind the phases of AC voltages Vu1, Vv1, and Vw1, respectively, by 60 degrees. For example, AC voltage Vu1 and AC voltage Vw2 are out of phase by 180 degrees. When AC voltage Vu1 is a positive peak value and AC voltage Vw2 is a negative peak value, voltage ΔV12=Vu1−Vw2 that is the difference between AC voltage Vu1 and AC voltage Vw2 is the sum of peak values of AC voltages Vu1 and Vw2. Conversely, when AC voltage Vu1 is a negative peak value and AC voltage Vw2 is a positive peak value, voltage ΔV21=Vw2−Vu1 that is the difference between AC voltage Vw2 and AC voltage Vu1 is the sum of peak values of AC voltages Vu1 and Vw2.

FIG. 6(C) shows a case where the phases of AC voltages Vu2, Vv2, and Vw2 are ahead of the phases of AC voltages Vu1, Vv1, and Vv1, respectively, by 60 degrees. For example, AC voltage Vu1 and AC voltage Vv2 are out of phase by 180 degrees. When AC voltage Vu1 is a positive peak value and AC voltage Vv2 is a negative peak value, voltage ΔV12=Vu1−Vv2 that is the difference between AC voltage Vu1 and AC voltage Vv2 is the sum of peak values of AC voltages Vu1 and Vv2. Conversely, when AC voltage Vu1 is a negative peak value and AC voltage Vv2 is a positive peak value, voltage ΔV21=Vv2−Vu1 that is the difference between AC voltage Vv2 and AC voltage Vu1 is the sum of peak values of AC voltages Vu1 and Vv2.

If, in the lap period, terminal-to-terminal voltage VDC of capacitor Cd is smaller than the sum of peak values of AC voltages Vu1, Vv1, Vw1 and peak values of AC voltages Vu2, Vv2, Vw2, the following problem arises. For example, as shown in FIG. 6(B), when AC voltages Vu1 and Vw2 are out of phase by 180 degrees and voltage ΔV12=Vu1−Vw2 that is the difference between AC voltages Vu1 and Vw2 is the sum of peak values of AC voltages Vu1 and Vw2, circulating current IC flows through the path shown in FIG. 7.

Figure 7:
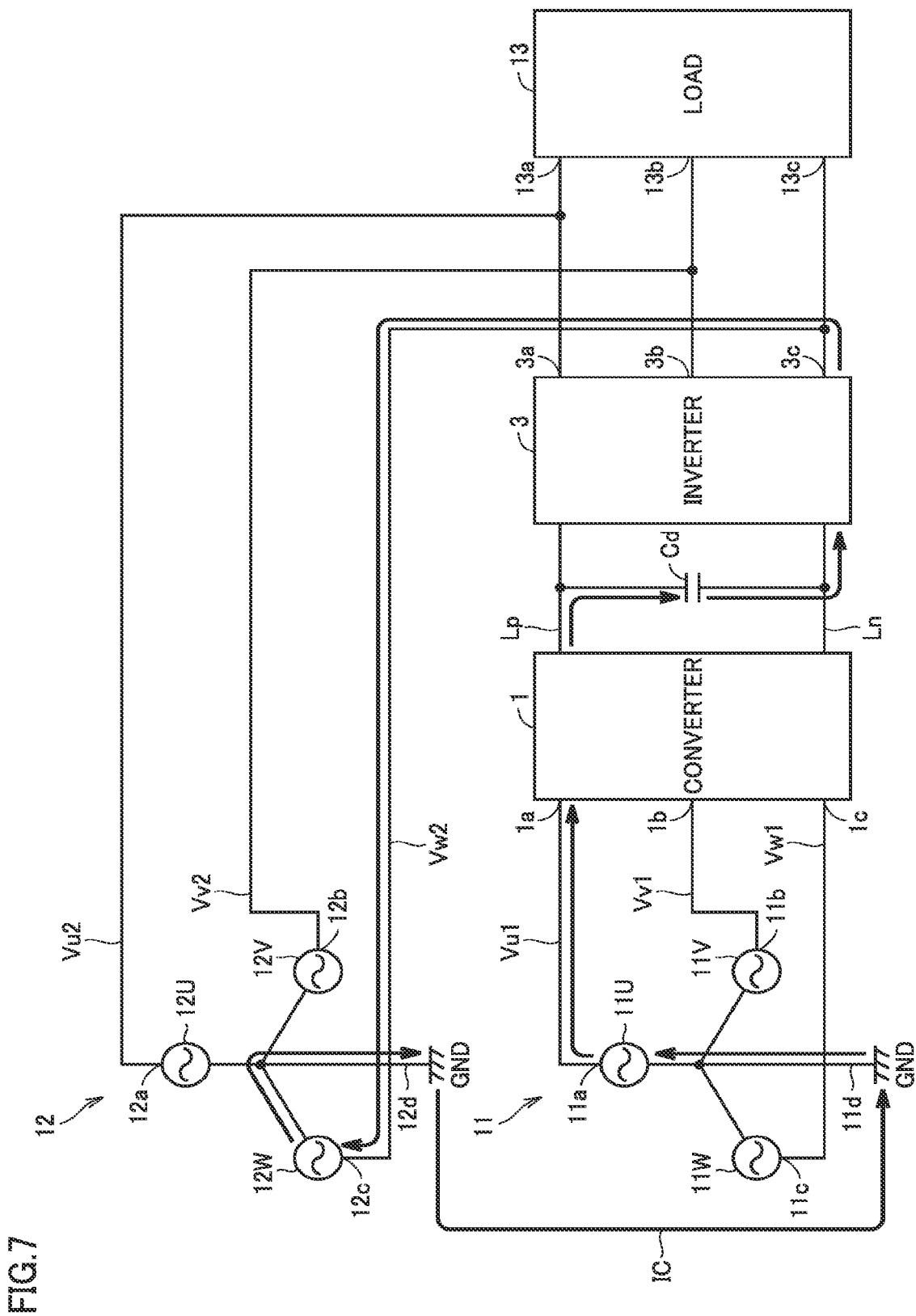
FIG. 7 is a circuit block diagram for explaining circulating current that flows in a lap power feed mode.

That is, circulating current IC flows through a path from the first terminal (AC output terminal 11a) of AC power supply 11U to the other terminal of AC power supply 11U through input node 1a of converter 1, diode D1 (FIG. 3), DC positive bus Lp, capacitor Cd, DC negative bus Ln, diode D16 (FIG. 3), output node 3c of inverter 3, AC power supply 12W, neutral point terminal 12d, the line of ground voltage GND, and neutral point terminal 11d. In FIG. 7, for the sake of simplicity of the drawing and the description, filters F1, F2, switches S1 to S9 that are turned on, and the like are not illustrated.

Figure 8:
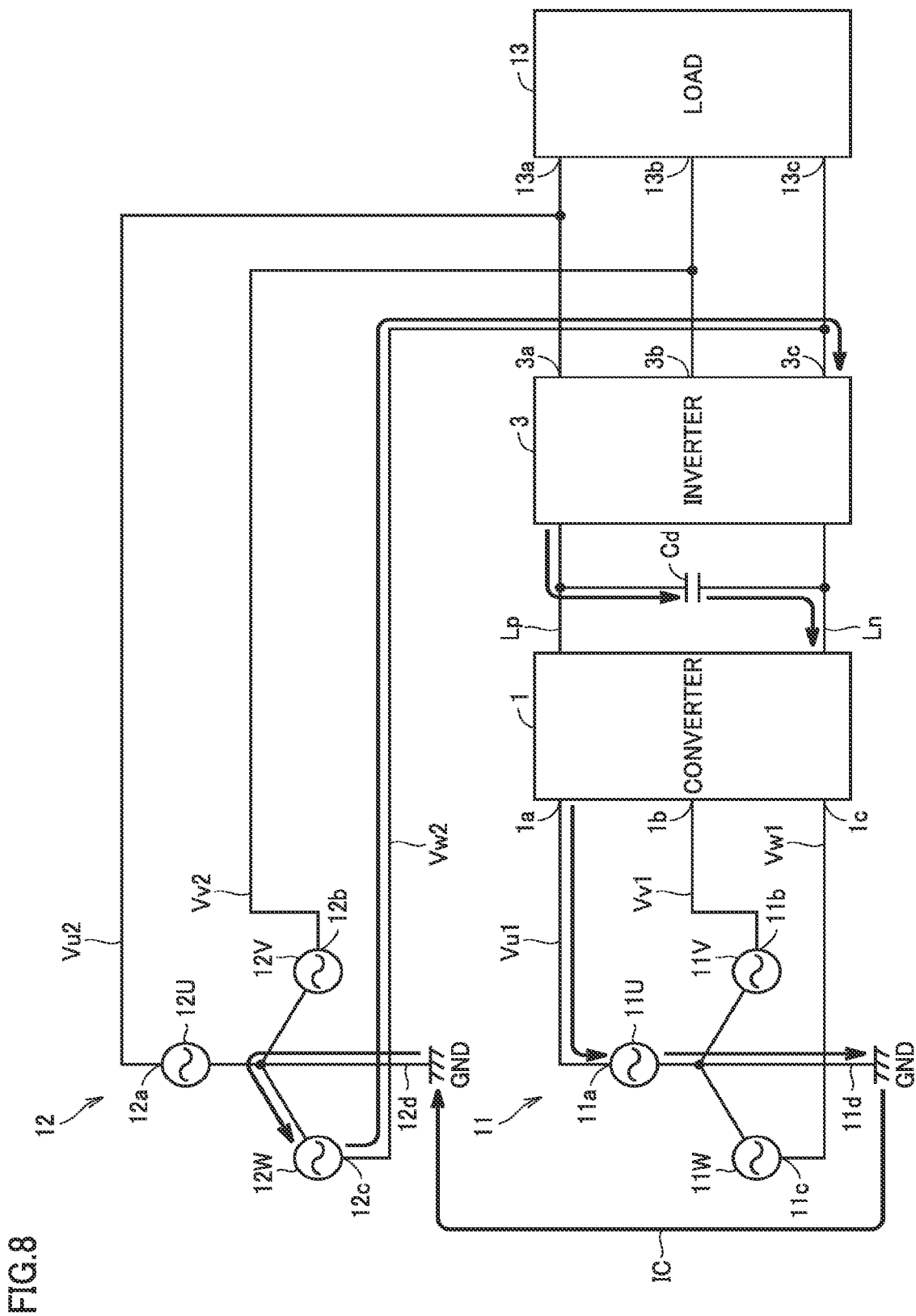
FIG. 8 is another circuit block diagram for explaining the circulating current that flows in the lap power feed mode.

Conversely, when voltage ΔV21=Vw2−Vu1 that is the difference between AC voltages Vw2 and Vu1 is the sum of peak values of AC voltages Vu1 and Vw2, circulating current IC flows through the path shown in FIG. 8 That is, circulating current IC flows through a path from the first terminal (AC output terminal 12c) of AC power supply 12W to the other terminal of AC power supply 12W through output node 3c of inverter 3, diode D13 (FIG. 3), DC positive bus Lp, capacitor Cd, DC negative bus Ln, diode D4 (FIG. 3), input node 1a of converter 1, AC power supply 11U, neutral point terminal 11d, the line of ground voltage GND, and neutral point terminal 12d.

When circulating current IC flows, circulating current IC charges capacitor Cd, terminal-to-terminal voltage VDC of capacitor Cd may exceed upper limit voltage VDCH, and controller 8 may determine that abnormality has occurred, so that the operation of the uninterruptible power supply apparatus may be stopped and the operation of load 13 may be stopped. The detected values of current detectors CT1 to CT6 may exceed upper limit current IH, and controller 8 may determine that abnormality has occurred, so that the operation of the uninterruptible power supply apparatus may be stopped and the operation of load 13 may be stopped.

Therefore, in the present embodiment, in the lap power feed mode, terminal-to-terminal voltage VDC of capacitor Cd is set to reference voltage VDCr2 equal to or higher than a voltage of the sum of the peak values of AC voltages Vu1, Vv1, Vw1 and the peak values of AC voltages Vu2, Vv2, Vw2, to prevent circulating current IC from flowing through the uninterruptible power supply apparatus.

In the present embodiment, in the inverter power feed mode and the bypass power feed mode, terminal-to-terminal voltage VDC of capacitor Cd is set to reference voltage VDCr1 lower than the voltage of the sum of the peak values of AC voltages Vu1, Vv1, Vw1 and the peak values of AC voltages Vu2, Vv2, Vw2, to reduce power consumption and improve efficiency.

When bypass AC power supply 12 is stable, AC output voltages Vu2, Vv2, and Vw2 of bypass AC power supply 12 match AC output voltages Vu1, Vv1, and Vw1 of commercial AC power supply 11, and therefore, the voltage of the sum of the peak values of AC voltages Vu1, Vv1, Vw1 and the peak values of AC voltages Vu2, Vv2, Vw2 is equal to the voltage twice the peak values of AC voltages Vu1, Vv1, Vw1. The peak values of AC voltages Vu1, Vv1, Vw1 are the same value.

For example, the effective value of AC voltage Vu1 is 277 V and the peak value thereof is 392 V. The voltage twice the peak value of AC voltage Vu1 is 784 V. Reference voltage VDCr1 is set to 750 V lower than 784 V. Reference voltage VDCr2 is set to 920 V higher than 784 V. Reference voltage VDCr2 is set to a value lower than upper limit value VDCH (for example, 1000 V) of terminal-to-terminal voltage VDC of capacitor Cd.

As a result, in the lap power feed mode, for example, even when AC voltage Vu1 becomes a positive peak value (+392

V) and AC voltage Vw2 becomes a negative peak value (−392 V), diodes D1 and D16 (FIG. 3) do not turn on and circulating current IC does not flow, because terminal-to-terminal voltage VDC=VDCr2 (920 V) of capacitor Cd is higher than the sum voltage (784 V) of the peak values of AC voltages Vu1 and Vw2.

Conversely, even when AC voltage Vu1 becomes a negative peak value (−392 V) and AC voltage Vw2 becomes a positive peak value (+392 V), diodes D13 and D4 (FIG. 3) do not turn on and circulating current IC does not flow, because terminal-to-terminal voltage VDC=VDCr2 (920 V) of capacitor Cd is higher than the sum voltage (784 V) of the peak values of AC voltages Vu1 and Vw2. As circulating current IC does not flow, overcurrent or overvoltage of capacitor Cd is not detected, the operation of the uninterruptible power supply apparatus is not stopped, and the operation of load 13 is not stopped.

Figure 9:
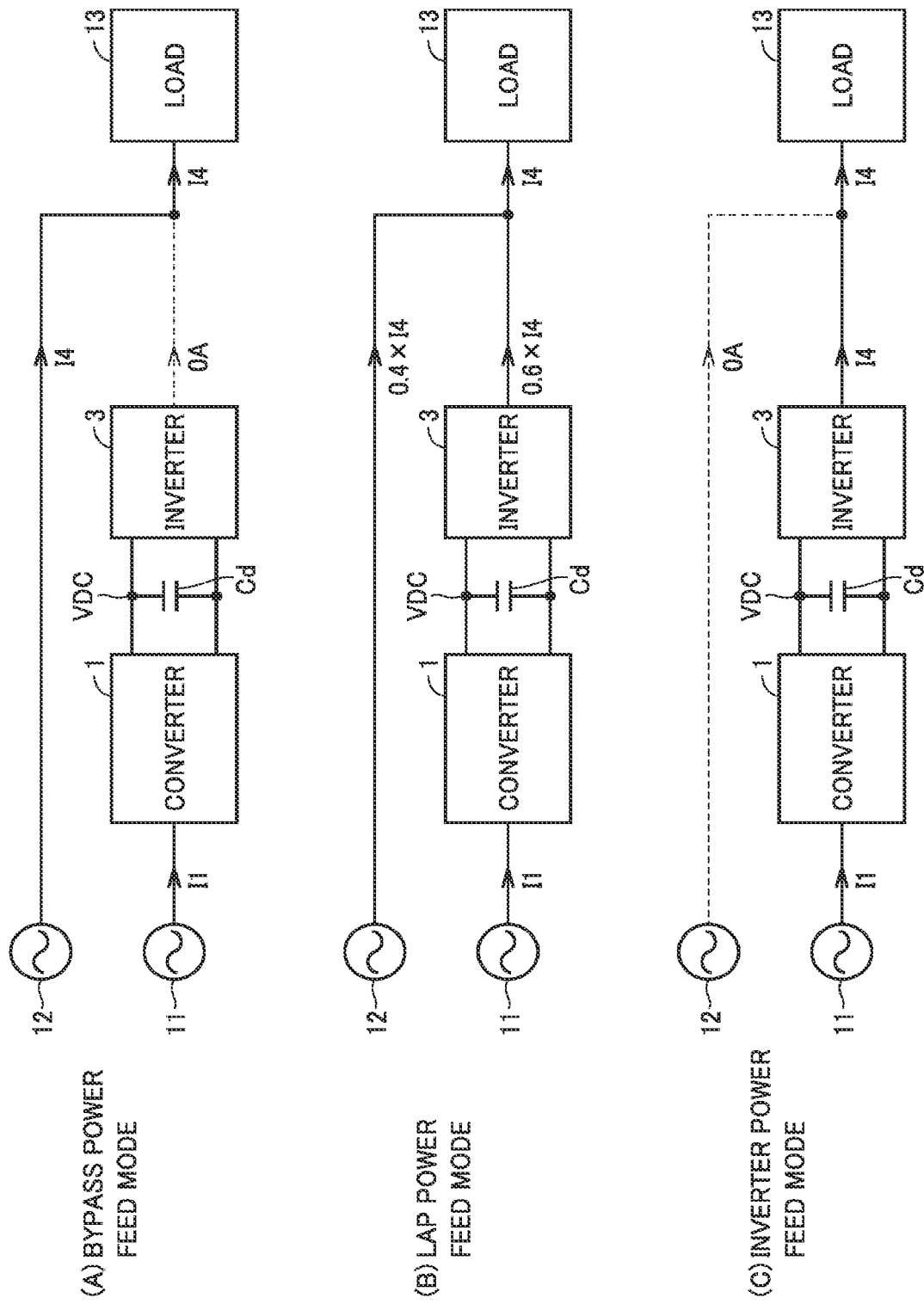
FIG. 9 is a circuit block diagram for explaining problems in the lap power feed mode.

A reason why the input current to converter 1 becomes larger than the output current from inverter 3 to cause DC voltage VDC to increase in the lap power feed mode, and means for addressing this are now described in detail. FIGS. 9(A) to 9(C) are circuit block diagrams showing the bypass power feed mode, the lap power feed mode, and the inverter power feed mode, respectively. In FIGS. 9(A) to 9(C), for the sake of simplicity of the drawings and the description, only a portion related to one of the three phases is illustrated, and switches S1 to S9, AC filters F1, F2, current detectors CT1 to CT6, and the like are not illustrated.

In the bypass power feed mode, as shown in FIG. 9(A), load current I4 is supplied from bypass AC power supply 12 to load 13. Converter 1 is controlled such that terminal-to-terminal voltage VDC of capacitor Cd becomes reference voltage VDCr1, and current I1=IFB+1.0×I4, which includes feedback component IFB having a value corresponding to deviation ΔVDC=VDCr1−VDC between reference voltage VDCr1 and terminal-to-terminal voltage VDC of capacitor Cd, and feedforward component IFF=1.0×I4 obtained by multiplying load current I4 by gain Kf (1.0 for example), is passed from commercial AC power supply 11 to converter 1.

Once terminal-to-terminal voltage VDC of capacitor Cd is charged to reference voltage VDCr1, feedback component IFB and feedforward component IFF cancel each other out, causing input current I1 to converter 1 to be nearly 0 A.

In the switching period of switching between the bypass power feed mode and the inverter power feed mode, the lap power feed mode is executed. In the lap power feed mode, as shown in FIG. 9(B), both inverter 3 and bypass AC power supply 12 are connected to load 13. Accordingly, a load on bypass AC power supply 12 changes suddenly and the frequency of the output voltage from bypass AC power supply 12 fluctuates, the output voltage from bypass AC power supply 12 and the output voltage from inverter 3 become out of phase from each other, and current I4 is supplied from both of inverter 3 and bypass AC power supply 12 to load 13 at a ratio corresponding to a phase difference between them. FIG. 9(B) shows a case where 60% of load current I4 is supplied from inverter 3 and 40% of load current I4 is supplied from bypass AC power supply 12.

When current flows from inverter 3 to load 13, terminal-to-terminal voltage VDC of capacitor Cd decreases, and input current I1=IFB+1.0×I4 to converter 1 increases. In this case, input current I1 to converter 1 becomes greater than the output current 0.6×I4 from inverter 3, which cannot be followed by feedback control, and terminal-to-terminal voltage VDC of capacitor Cd may become higher than reference voltage VDCr2 and exceed upper limit voltage VDCH. In the present embodiment, the time for the lap power feed mode is shortened to thereby suppress the increase of DC voltage VDC. A method for shortening the time for the lap power feed mode is described later herein.

In the inverter power feed mode, as shown in FIG. 9(C), load current I4 is supplied from inverter 3 to load 13. Converter 1 is controlled such that terminal-to-terminal voltage VDC of capacitor Cd becomes reference voltage VDCr1, and current I1=IFB+Kf×I4, which includes feedback component IFB having a value corresponding to deviation ΔVDC=VDCr1−VDC between reference voltage VDCr1 and terminal-to-terminal voltage VDC of capacitor Cd, and feedforward component IFF=Kf×I4 obtained by multiplying load current I4 by gain Kf, is passed from commercial AC power supply 11 to converter 1.

In this case, by passing feedforward component IFF to converter 1, the response speed of feedback component IFB can be reduced to stably control terminal-to-terminal voltage VDC of capacitor Cd, and to control terminal-to-terminal voltage VDC of capacitor Cd at a high speed in response to fluctuation in load current I4.

Figure 10:
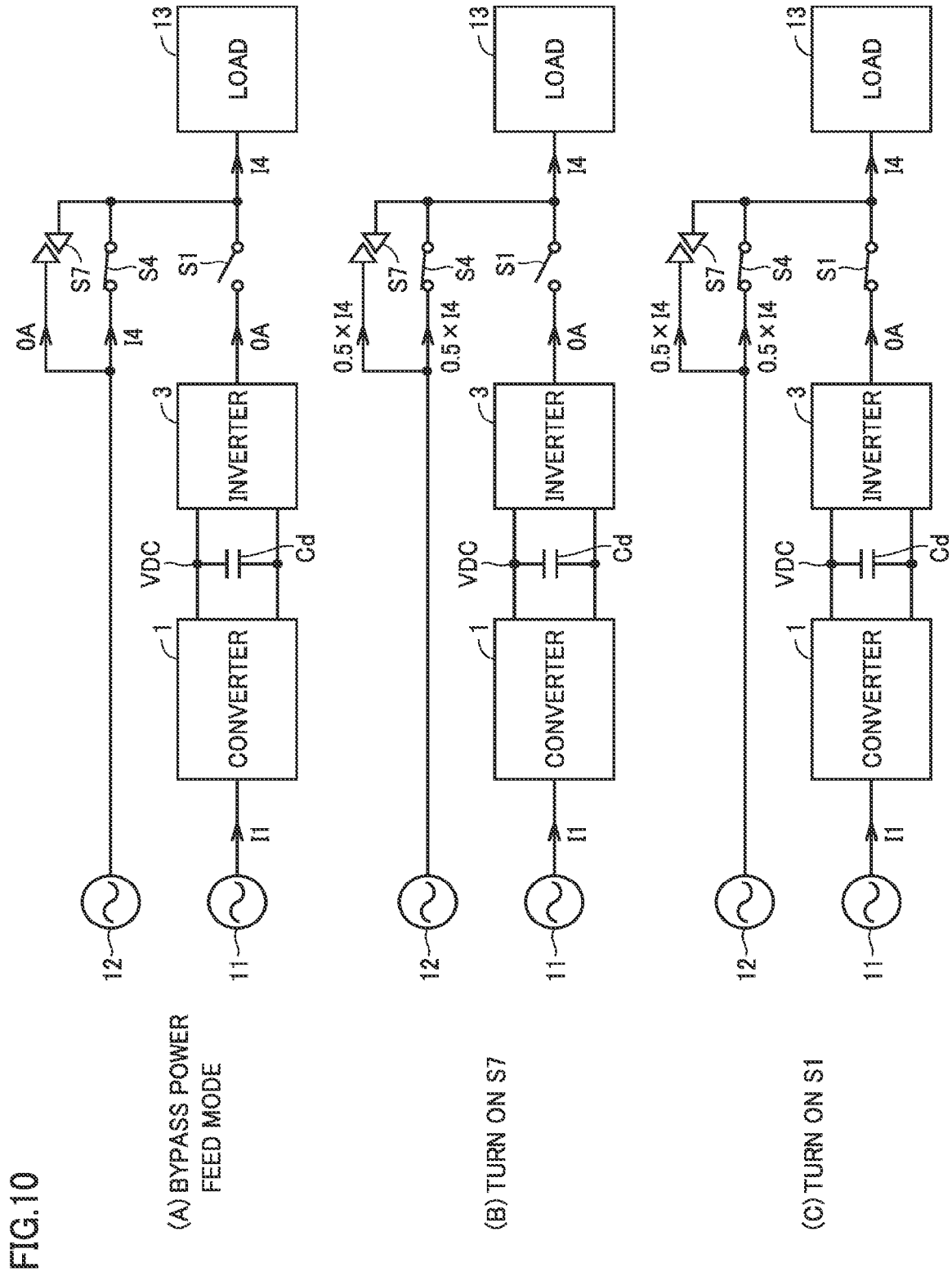
FIG. 10 is a circuit block diagram showing an operation of the uninterruptible power supply apparatus in a switching period in which a bypass power feed mode is switched to an inverter power feed mode.
Figure 11:
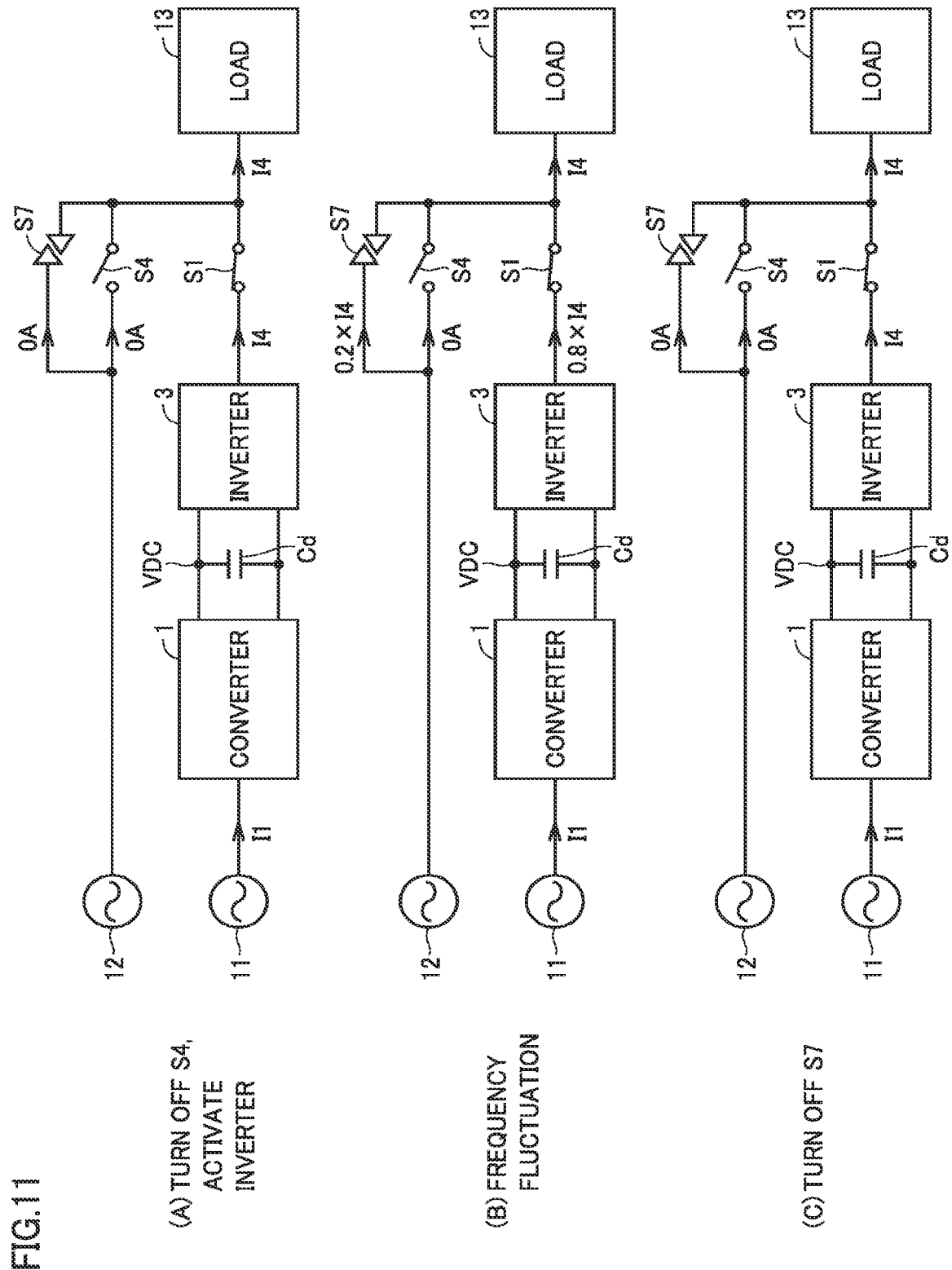
FIG. 11 is another circuit block diagram showing an operation of the uninterruptible power supply apparatus in a switching period in which the bypass power feed mode is switched to the inverter power feed mode.

FIGS. 10 and 11 are each a circuit block diagram showing an operation of the uninterruptible power supply apparatus in a switching period in which the bypass power feed mode is switched to the inverter power feed mode, and illustrating a method for reducing an increase of DC voltage VDC shown in FIG. 9(B). In FIGS. 10 and 11, for the sake of simplicity of the drawings and the description, only a portion related to one of the three phases is illustrated, and AC filters F1, F2, current detectors CT1 to CT6, and the like are not illustrated.

In FIG. 10(A), in the bypass power feed mode, switch S4 of electromagnetic contactor 5 is ON, so that load current I4 flows from bypass AC power supply 12 to load 13 through switch S4. Thyristor switch S7 of semiconductor switch 6 is OFF, so that current flowing to thyristor switch S7 is 0 A. Inverter 3 is inactivated and switch S1 of electromagnetic contactor 4 is OFF, so that the output current from inverter 3 is 0 A.

In FIG. 10(B), when an instruction is given to switch the bypass power feed mode to the inverter power feed mode, initially thyristor switch S7 is turned on, so that load current I4 flows from bypass AC power supply 12 to load 13 through switches S4 and S7 connected in parallel with each other. FIG. 10(B) shows a state where 50% of load current I4 flows to each of switches S4 and S7.

As shown in FIG. 10(C), switch S1 is then turned on. At this time, inverter 3 has been inactivated, so that no current flows to switch S1. Subsequently, as shown in FIG. 11(A), switch S4 is turned off and inverter 3 is activated.

At this instant, inverter 3 is controlled such that the AC output voltage from inverter 3 and the AC output voltage from bypass AC power supply 12 are in phase with each other, and the peak value of the AC output voltage from inverter 3 is larger than the peak value of the AC output voltage from bypass AC power supply 12. Therefore, load current I4 is supplied from inverter 3 to load 13 through switch S1 and current flowing to thyristor switch S7 is 0 A.

However, when load current I4 is supplied from inverter 3, the load on bypass AC power supply 12 is alleviated suddenly, so that the frequency of bypass AC power supply 12, which is a private power generator, increases to cause a phase difference between the AC output voltage from inverter 3 and the AC output voltage from bypass AC power supply 12.

Therefore, as shown in FIG. 11(B), current I4 is supplied to load 13 from both inverter 3 and bypass AC power supply 12 at a ratio corresponding to the phase difference between them. FIG. 11(B) shows a case where 80% of load current I4 is supplied from inverter 3 and 20% of load current I4 is supplied from bypass AC power supply 12.

When current flows from inverter 3 to load 13, terminal-to-terminal voltage VDC of capacitor Cd decreases, and input current I1=IFB+1.0×I4 to converter 1 increases. In this case, input current I1 to converter 1 becomes greater than the output current 0.8×I4 from inverter 3, which cannot be followed by feedback control, and terminal-to-terminal voltage VDC of capacitor Cd begins to increase.

Next, as shown in FIG. 11(C), thyristor switch S7 is turned off. Accordingly, the output current from inverter 3 matches load current I4, the difference between input current I1 to converter 1 and output current I4 from inverter 3 is reduced, feedback control is performed accordingly, and terminal-to-terminal voltage VDC of capacitor Cd is kept at reference voltage VDCr1.

In the present embodiment, the lap power feed mode is performed from the activation of inverter 3 to the turn-off of thyristor switch S7. The response time of thyristor switch S7 is shorter than the response time of switch S4, and therefore, the time for the lap power feed mode can be shortened relative to that for the conventional lap power feed mode which is ended by turning off switch S4, and the increase of DC voltage VDC can be suppressed.

Figure 12:
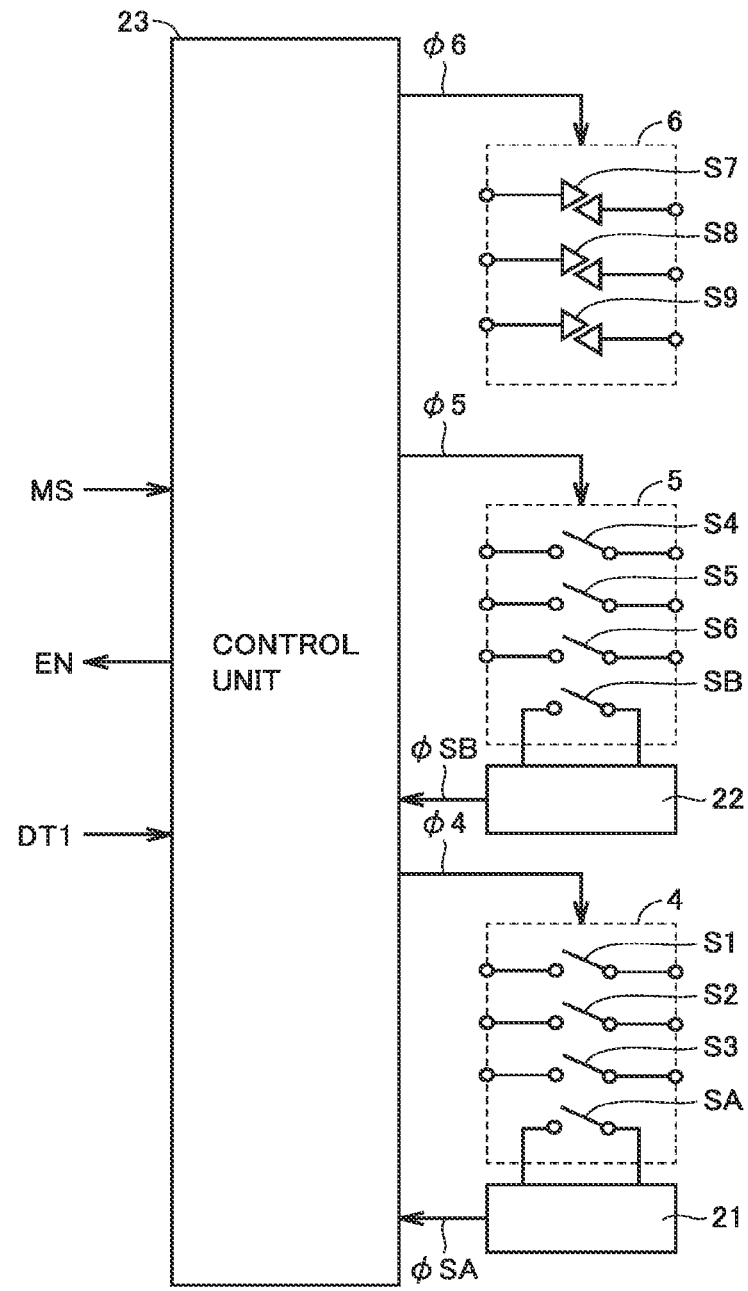
FIG. 12 is a circuit block diagram showing a configuration of a part of a controller shown in FIG. 1 that is involved in control of electromagnetic contactors and a semiconductor switch.

FIG. 12 is a circuit block diagram showing a configuration of a part of controller 8 involved in control of switches S1 to S9. In FIG. 12, controller 8 includes signal generating circuits 21, 22 and a control unit 23. Electromagnetic contactor 4 includes an auxiliary switch SA in addition to switches S1 to S3. Auxiliary switch SA operates in conjunction with switches S1 to S3. Switches S1 to S3 and SA are controlled by control signal φ4 from control unit 23. When control signal φ4 is "L" level, switches S1 to S3 and SA are turned off together. When control signal φ4 is "H" level, switches S1 to S3 and SA are turned on together.

Signal generating circuit 21 detects whether auxiliary switch SA is ON or not and outputs signal φSA indicating a result of the detection. When auxiliary switch SA is OFF, signal φSA is set to "L level" and, when auxiliary switch SA is ON, signal φSA is set to "H" level.

Likewise, electromagnetic contactor 5 includes an auxiliary switch SB in addition to switches S4 to S6. Auxiliary switch SB operates in conjunction with switches S4 to S6. Switches S4 to S6 and SB are controlled by control signal φ5 from control unit 23. When control signal φ5 is "L" level, switches S4 to S6 and SB are turned off together. When control signal φ5 is "H" level, switches S4 to S6 and SB are turned on together.

Signal generating circuit 22 detects whether auxiliary switch SB is ON or not and outputs signal φSB indicating a result of the detection. When auxiliary switch SB is OFF, signal φSB is set to "L level" and, when auxiliary switch SB is ON, signal φSB is set to "H" level.

Semiconductor switch 6 is controlled by control signal φ6 from control unit 23. When control signal φ6 is "L" level, thyristor switches S7 to S9 are turned off together. When control signal φ6 is "H" level, thyristor switches S7 to S9 are turned on together.

Based on mode select signal MS from operation unit 7 (FIG. 1) and respective output signals φSA and φSB from signal generating circuits 21 and 22, control unit 23 generates control signals φ4 to φ6 and control signal EN that controls activation and inactivation of inverter 3.

When a user of the uninterruptible power supply apparatus uses operation unit 7 to select the bypass power feed mode, mode select signal MS is set to "L" level. When a user of the uninterruptible power supply apparatus uses operation unit 7 to select the inverter power feed mode, mode select signal MS is set to "H" level.

When mode select signal MS is "L" level (bypass power feed mode), control unit 23 sets control signals φ4 and φ6 to "L" level to turn off electromagnetic contactor 4 and semiconductor switch 6, sets control signal φ5 to "H" level to turn on electromagnetic contactor 5, and sets control signal EN to "L" level to inactivate inverter 3. Accordingly, three-phase AC power is supplied from bypass AC power supply 12 to load 13 through electromagnetic contactor 5.

When mode select signal MS is "H" level (inverter power feed mode), control unit 23 sets control signals φ5 and φ6 to "L" level to turn off electromagnetic contactor 5 and semiconductor switch 6, sets control signal φ4 to "H" level to turn on electromagnetic contactor 4, and sets control signal EN to "H" level to activate inverter 3. Accordingly, three-phase AC power is supplied from inverter 3 to load 13 through AC filter F2 and electromagnetic contactor 4.

In a switching period in which mode select signal MS is switched from "L" level to "H" level (switching period in which the bypass power feed mode is switched to the inverter power feed mode), control unit 23 sets control signal φ6 to "H" level to turn on semiconductor switch 6 and sets control signal φ4 to "H" level to turn on electromagnetic contactor 4.

In response to rise of signal φSA from "L" level to "H" level, control unit 23 sets control signal φ5 to "L" level to turn off electromagnetic contactor 5. Further, in response to rise of signal φSA from "L" level to "H" level, control unit 23 sets control signal EN to "H" level to activate inverter 3, and thereafter sets control signal φ6 to "L" level to turn off semiconductor switch 6. Accordingly, three-phase AC power is supplied from inverter 3 to load 13 through AC filter F2 and electromagnetic contactor 4.

In a switching period in which mode select signal MS is switched from "H" level to "L" level (switching period in which the inverter power feed mode is switched to the bypass power feed mode), control unit 23 sets control signal φ5 to "H" level to turn on electromagnetic contactor 5. In response to rise of signal φSB from "L" level to "H" level, control unit 23 sets control signal φ4 to "L" level to turn off electromagnetic contactor 4. Accordingly, three-phase AC power is supplied from bypass AC power supply 12 to load 13 through electromagnetic contactor 5.

Based on fault detection signal DT1 indicating occurrence of a fault of inverter 3 and respective output signals φSA and φSB from signal generating circuits 21 and 22, control unit 23 generates control signals φ4 to 06 and control signal EN that controls activation and inactivation of inverter 3.

When inverter 3 is operated in a normal manner in the inverter power feed mode, fault detection signal DT1 is set to "L" level which is the inactivation level and, when a fault of inverter 3 occurs, fault detection signal DT1 is set to "H" level which is the activation level.

When fault detection signal DT1 is "L" level in the inverter power feed mode, control unit 23 sets control signals φ5 and φ6 to "L" level to turn off electromagnetic contactor 5 and semiconductor switch 6, sets control signal φ4 to "H" level to turn on electromagnetic contactor 4, and sets control signal EN to "H" level to activate inverter 3.

When fault detection signal DT1 is caused to rise from "L" level to "H" level in the inverter power feed mode, control unit 23 sets control signals φ5 and φ6 to "H" level, sets control signal φ4 to "L" level, and sets control signal EN to "L" level. When control signal φ6 is set to "H" level, semiconductor switch 6 is turned on instantaneously and, when control signal EN is set to "L" level, inverter 3 is inactivated.

When control signal φ5 is set to "H" level, electromagnetic contactor 5 is turned on after an elapse of a predetermined ON time and signal φSB is caused to rise from "L" level to "H" level. When control signal φ4 is set to "L" level, electromagnetic contactor 4 is turned off after an elapse of a predetermined OFF time and signal φSA is caused to fall from "H" level to "L" level. In response to a rising edge of signal φSB, control unit 23 sets control signal φ6 to "L" level to turn off semiconductor switch 6.

Figure 13:
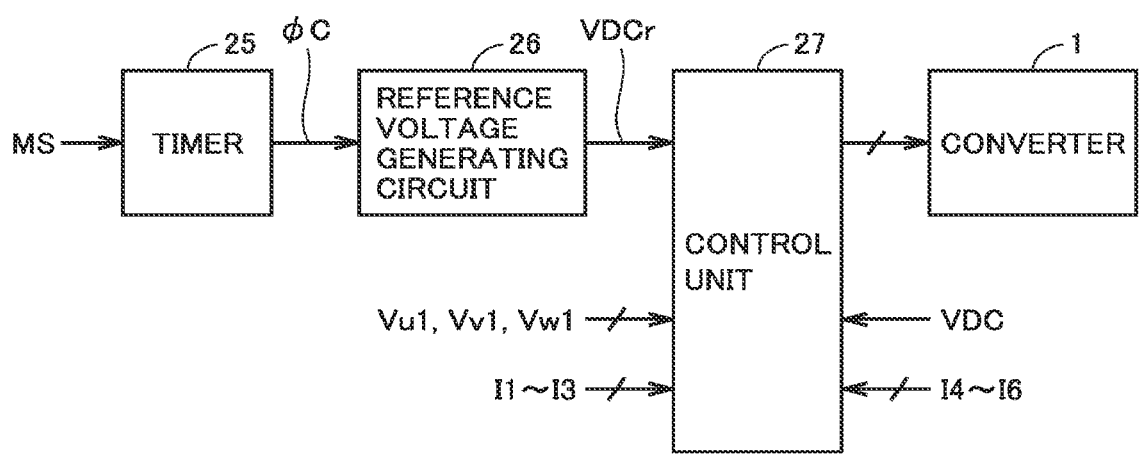
FIG. 13 is a block diagram showing a configuration of a part of the controller shown in FIG. 1 that is involved in control of the converter.

FIG. 13 is a block diagram showing a configuration of a part of controller 8 involved in control of converter 1. In FIG. 13, controller 8 includes a timer 25, a reference voltage generating circuit 26, and a control unit 27.

Timer 25 generates switch signal φC based on a change in level of mode select signal MS. When mode select signal MS is kept at "L" level or "H" level, switch signal φC is kept at "L" level. When mode select signal MS is changed from "L" level to "H" level, switch signal φC is set to "H" level for only a certain period of time. When mode select signal MS is changed from "H" level to "L" level, switch signal φC is set to "H" level for only a certain period of time.

In accordance with switch signal φC, reference voltage generating circuit 26 outputs reference voltage VDCr. When switch signal φC is "L" level, reference voltage VDCr is set to reference voltage VDCr1. When switch signal φC is "H" level, reference voltage VDCr is set to reference voltage VDCr2 higher than reference voltage VDCr1.

Therefore, in the bypass power feed mode and the inverter power feed mode, reference voltage VDCr is set to reference voltage VDCr1. In a switching period in which any one of the bypass power feed mode and the inverter power feed mode is switched to the other power feed mode, reference voltage VDCr is set to reference voltage VDCr2.

Based on reference voltage VDCr, DC voltage VDC, AC input voltages Vu1, Vv1, Vw1, AC input currents I1 to I3, and load currents I4 to I6, control unit 27 generates gate signals A1 to A3 and B1 to B3 (FIG. 3) to thereby control converter 1 such that DC voltage VDC becomes reference voltage VDCr.

At this time, control unit 27 controls converter 1 such that currents I1 to I3, which include feedback component IFB having a value corresponding to deviation ΔVDC=VDCr−VDC between reference voltage VDCr and DC voltage VDC, and feedforward component IFF obtained by multiplying load currents I4 to I6 by gain Kf, flow from commercial AC power supply 11 to converter 1.

Figure 14:
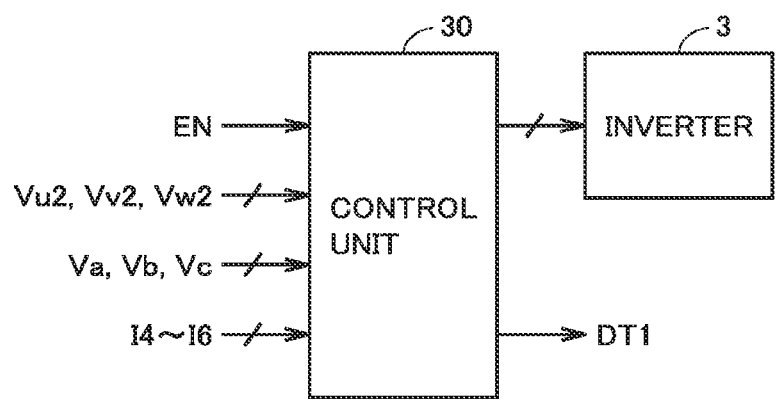
FIG. 14 is a block diagram showing a configuration of a part of the controller shown in FIG. 1 that is involved in control of the inverter.

FIG. 14 is a block diagram showing a part of controller 8 that is involved in control of inverter 3. In FIG. 14, controller 8 includes a control unit 30. Based on control signal EN from control unit 23, load currents I4 to I6, AC output voltages Va to Vc, and AC voltages Vu2, Vv2, and Vw3 of bypass AC power supply 12, control unit 30 generates gate signals X1 to X3 and Y1 to Y3 (FIG. 3) to thereby control inverter 3.

When control signal EN is "L" level, control unit 27 stops output of gate signals X1 to X3 and Y1 to Y3 to thereby stop the operation of inverter 3. At this time, IGBTs Q11 to Q16 (FIG. 3) of inverter 3 are kept in the OFF state. When control signal EN is "H" level, control unit 27 outputs gate signals X1 to X3 and Y1 to Y3 to thereby operate inverter 3. At this time, each of IGBTs Q11 to Q16 of inverter 3 is turned on and off at a predetermined timing, and inverter 3 outputs three-phase AC power.

Control unit 30 determines, while inverter 3 operates, whether inverter 3 operates in a normal manner or not, and outputs fault detection signal DT1 (FIG. 12) based on a result of the determination. Control unit 30 determines whether or not a fault of inverter 3 has occurred, based on the waveform of AC output voltages Va to Vc (FIG. 1) from inverter 3, for example. When inverter 3 operates in a normal manner, fault detection signal DT1 is set to "L" level which is the inactivation level. When a fault of inverter 3 occurs, fault detection signal DT1 is set to "H" level which is the activation level.

Figure 15:
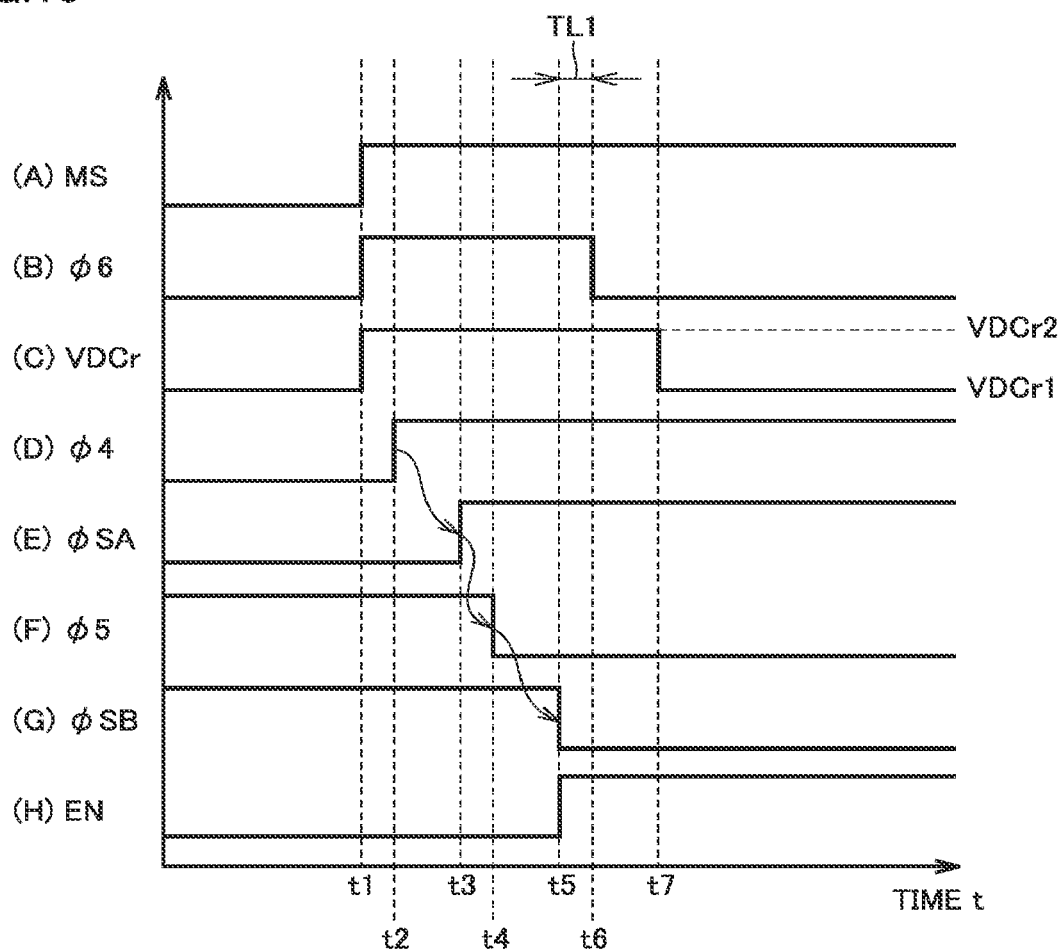
FIG. 15 is a time chart showing an operation of a controller 8 in a switching period in which the bypass power feed mode is switched to the inverter power feed mode.

FIG. 15 is a time chart showing an operation of controller 8 in a switching period in which the bypass power feed mode is switched to the inverter power feed mode. In FIG. 15, (A) to (H) indicate respective waveforms of mode select signal MS, control signal φ6, reference voltage VDCr, signals φ4, φSA, φ5, φSB, and EN, respectively. In the initial state, mode select signal MS is set to "L" level and thus the bypass power feed mode is performed.

In the bypass power feed mode, control signal φ6 (FIG. 12) is set to "L" level to turn off semiconductor switch 6, and reference voltage VDCr is set to reference voltage VDCr1. Control signal φ4 is set to "L" level to turn off electromagnetic contactor 4, and signal φSA is set to "L" level. Control signal φ5 is set to "H" level to turn on electromagnetic contactor 5, and signal φSB is set to "H" level. Further, control signal EN is set to "L" level to inactivate inverter 3.

At time t1, the inverter power feed mode is selected to cause mode select signal MS to rise from "L" level to "H" level. Then, control unit 23 (FIG. 12) causes control signal φ6 to rise from "L" level to "H" level and thereby turn on semiconductor switch 6, while timer 25 and reference voltage generating circuit 26 set reference voltage VDC to reference voltage VDCr2 hither than reference voltage VDC1. The ON time of semiconductor switch 6 is sufficiently short, and therefore, when control signal φ6 is set to "H" level, semiconductor switch 6 is turned on instantaneously.

Next, at time t2, control signal φ4 is caused to rise from "L" level to "H" level. After an elapse of a predetermined ON time from a rising edge of control signal φ4, switches S1 to S3 and SA of electromagnetic contactor 4 are turned on and signal φSA is caused to rise from "L" level to "H" level (time t3).

In response to a rising edge of signal φSA, control signal φ5 is caused to fall from "H" level to "L" level (time t4). After an elapse of a predetermined OFF time from a falling edge of control signal φ5, switches S4 to S6 and SB of electromagnetic contactor 5 are turned off and signal φSB is caused to fall from "H" level to "L" level (time t5).

In response to a falling edge of signal φSB, control signal EN is caused to rise from "L" level to "H" level and inverter 3 is activated (time t5). Accordingly, three-phase AC power is supplied from inverter 3 to load 13 through electromagnetic contactor 4, and three-phase AC power is supplied from bypass AC power supply 12 to load 13 through semiconductor switch 6, and thus the lap power feed mode is performed.

At time t6 after an elapse of a certain period of time from a falling edge of signal φSB, control signal φ6 is caused to fall from "H" level to "L" level and semiconductor switch 6 is turned off. Accordingly, power feed from bypass AC power supply 12 to load 13 is stopped and the lap power feed mode is ended. The time from time t5 to t6 is the lap power feed mode. Semiconductor switch 6 here operates at a higher speed than electromagnetic contactors 4, 5, and therefore, time TL1 for the lap power feed mode is shorter than the conventional one. At time t7, reference voltage VDCr is lowered from reference voltage VDCr2 to reference voltage VDCr1, and switching from the bypass power feed mode to the inverter power feed mode is completed.

An operation of this uninterruptible power supply apparatus is now described briefly. When the inverter power feed mode is selected by means of operation unit 7 in a sound state of commercial AC power supply 11, three-phase AC currents I1 to I3 including the feedback component and the feedforward component are passed from commercial AC power supply 11 to converter 1, such that terminal-to-terminal voltage VDC of capacitor Cd becomes reference voltage VDCr1. The feedforward component is passed to converter 1 to thereby enable stable control of converter 1 and high-speed control of converter 1 in response to fluctuation in load currents I4 to I6.

Moreover, bidirectional chopper 2 is controlled such that terminal-to-terminal voltage VB of battery B1 becomes reference voltage VBr, and inverter 3 is controlled such that AC output voltages Va to Vc are synchronized respectively with AC output voltages Vu2, Vv2, and Vw2 of bypass AC power supply 12.

Moreover, electromagnetic contactor 4 is turned on, electromagnetic contactor 5 and semiconductor switch 6 are turned off, and inverter 3 is connected to load 13 through AC filter F2 and electromagnetic contactor 4. Accordingly, AC output voltages Va to Vc are supplied to load 13 through electromagnetic contactor 4 to thereby drive load 13.

When a power failure of commercial AC power supply 11 occurs, the operation of converter 1 is stopped, bidirectional chopper 2 is controlled such that terminal-to-terminal voltage VDC of capacitor Cd becomes reference voltage VDCr1, and inverter 3 is controlled such that AC output voltages Va to Vc are synchronized respectively with AC output voltages Vu2, Vv2, and Vw2 of bypass AC power supply 12.

When DC power in battery B1 is consumed and terminal-to-terminal voltage VB of battery B1 reaches a lower limit voltage, the operation of bidirectional chopper 2 and inverter 3 is stopped. Thus, even when a power failure of commercial AC power supply 11 occurs, the operation of load 13 can be continued for a period until terminal-to-terminal voltage VB of battery B1 reaches the lower limit voltage.

When a fault of inverter 3 occurs in the inverter power feed mode, semiconductor switch 6 is turned on instantaneously and three-phase AC power is supplied from bypass AC power supply 12 to load 13 through semiconductor switch 6, to thereby continue the operation of load 13. Further, electromagnetic contactor 5 is turned on, electromagnetic contactor 4 is turned off, and semiconductor switch 6 is turned off after an elapse of a certain time, to thereby supply three-phase AC power from bypass AC power supply 12 to load 13 through electromagnetic contactor 5.

When the bypass power feed mode is selected by means of operation unit 7 in the inverter power feed mode, three-phase AC currents I1 to I3 including the feedback component and the feedforward component are passed from commercial AC power supply 11 to converter 1, such that terminal-to-terminal voltage VDC of capacitor Cd becomes reference voltage VDCr2 higher than reference voltage VDCr1.

Moreover, both electromagnetic contactors 4 and 5 are turned on and three-phase AC power is supplied from both inverter 3 and bypass AC power supply 12 to load 13, so that the lap power feed mode is performed. At this time, VDC=VDCr2 is satisfied, which prevents circulating current from flowing between commercial AC power supply 11 and bypass AC power supply 12.

Subsequently, electromagnetic contactor 4 is turned off and only electromagnetic contactor 5 is turned on, so that the operation of inverter 3 is stopped, to thereby supply three-phase AC power from only bypass AC power supply 12 to load 13. Moreover, converter 1 is controlled to reduce terminal-to-terminal voltage VDC of capacitor Cd to reference voltage VDCr1, and the switching from the inverter power feed mode to the bypass power feed mode is completed.

In the switching period in which the inverter power feed mode is switched to the bypass power feed mode, the time for the lap power feed mode may be extended to increase DC voltage VDC, and DC voltage VDC may exceed upper limit voltage VDCH to cause stoppage of the operation of inverter 3. In the switching period, however, even when the operation of inverter 3 is stopped, there arises no problem because the operation of load 13 is continued by three-phase AC power from bypass AC power supply 12.

When the inverter power feed mode is selected by means of operation unit 7 in the bypass power feed mode, three-phase AC currents I1 to I3 including the feedback component and the feedforward component are passed from commercial AC power supply 11 to converter 1, such that terminal-to-terminal voltage VDC of capacitor Cd becomes reference voltage VDCr2 higher than reference voltage VDCr1.

Moreover, as shown in FIG. 15, semiconductor switch 6 and electromagnetic contactor 4 are turned on, electromagnetic contactor 5 is turned off, inverter 3 is activated, and thereafter semiconductor switch 6 is turned off. When inverter 3 is activated, three-phase AC power is supplied from inverter 3 and bypass AC power supply 12 to load 13 through electromagnetic contactor 4 and semiconductor switch 6. At this time, VDC=VDCr2 is satisfied, and therefore, no circulating current IC flows in the uninterruptible power supply apparatus.

Moreover, when semiconductor switch 6 is turned off, three-phase AC power is supplied from inverter 3 to load 13 through electromagnetic contactor 4. Semiconductor switch 6 operates faster than electromagnetic contactors 4, 5, and therefore, time TL1 for the lap power feed mode can be shortened relative to the conventional one, and an increase of terminal-to-terminal voltage VDC of capacitor Cd in the lap power feed mode can be reduced. After this, converter 1 causes terminal-to-terminal voltage VDC of capacitor Cd to be reduced to reference voltage VDCr1, and the switching from the bypass power feed mode to the inverter power feed mode is completed.

As seen from the foregoing, according to the present embodiment, in the switching period in which the bypass power feed mode is switched to the inverter power feed mode, semiconductor switch 6 and electromagnetic contactor 4 are turned on and electromagnetic contactor 5 is turned off and, in this state, inverter 3 is activated to start the lap power feed mode, and the lap power feed mode is ended by turning off semiconductor switch 6. Thus, the lap power feed mode can be ended in a short time, and therefore, an increase of terminal-to-terminal voltage VDC of capacitor Cd can be reduced and terminal-to-terminal voltage VDC of capacitor Cd can be prevented from exceeding upper limit voltage VDCH.

Moreover, AC currents I1 to I3 including feedback component IFB and feedforward component IFF are caused to flow into converter 1, and therefore, feedback component IFB can be controlled at a low speed to stabilize the control and a sudden change of load currents I4 to I6 can be addressed by feedforward component IFF.

Moreover, in the switching period, converter 1 is controlled such that terminal-to-terminal voltage VDC of capacitor Cd becomes reference voltage VDCr2 higher than reference voltage VDCr1, to thereby prevent circulating current IC from flowing in the path including capacitor Cd for example. Therefore, even when neutral point terminal 11d of commercial AC power supply 11 and neutral point terminal 12d of bypass AC power supply 12 are both grounded, flow of circulating current IC can be prevented.

COMPARATIVE EXAMPLE

Figure 16:
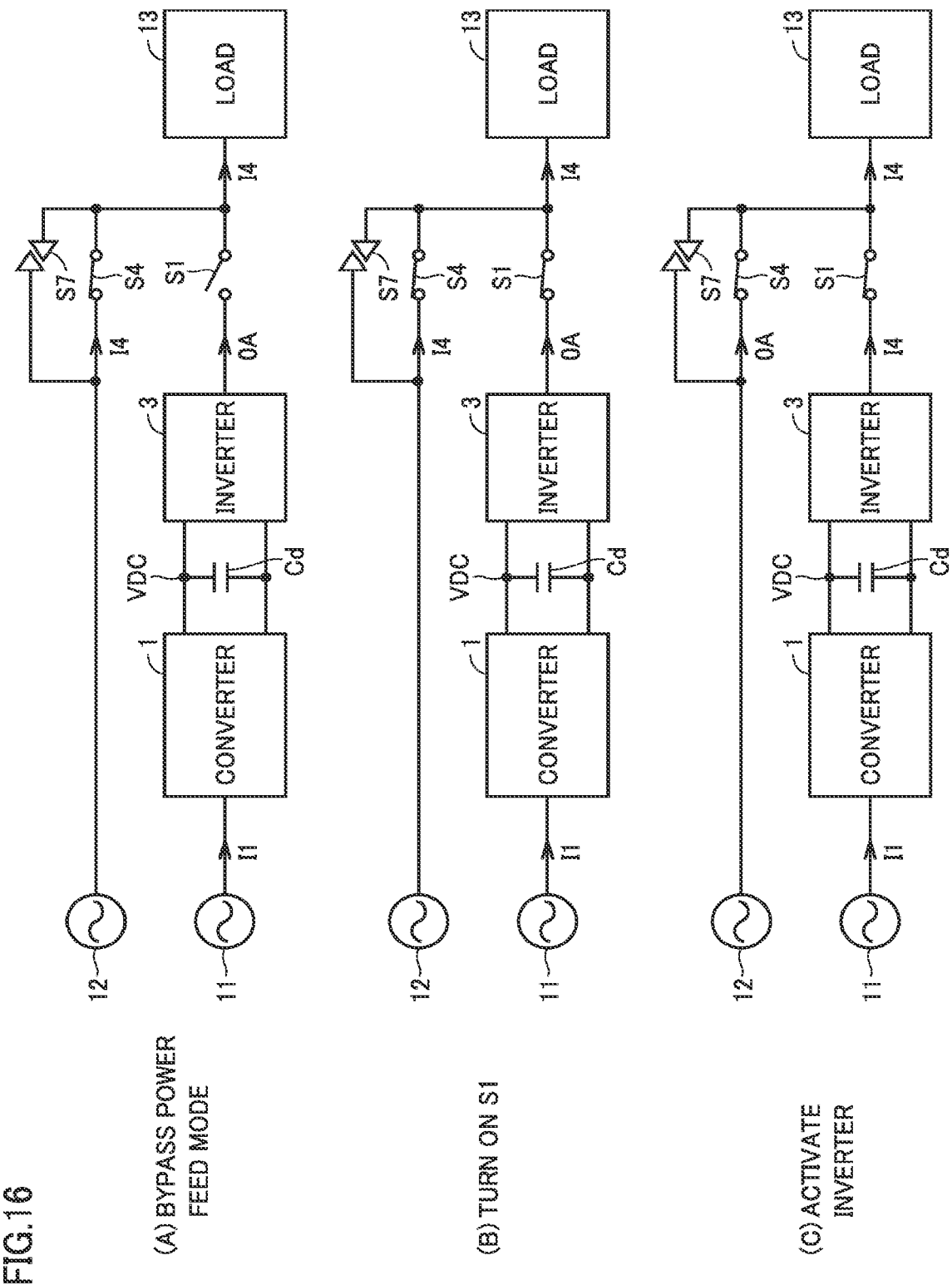
FIG. 16 is a circuit block diagram showing a comparative example of the embodiment.
Figure 17:
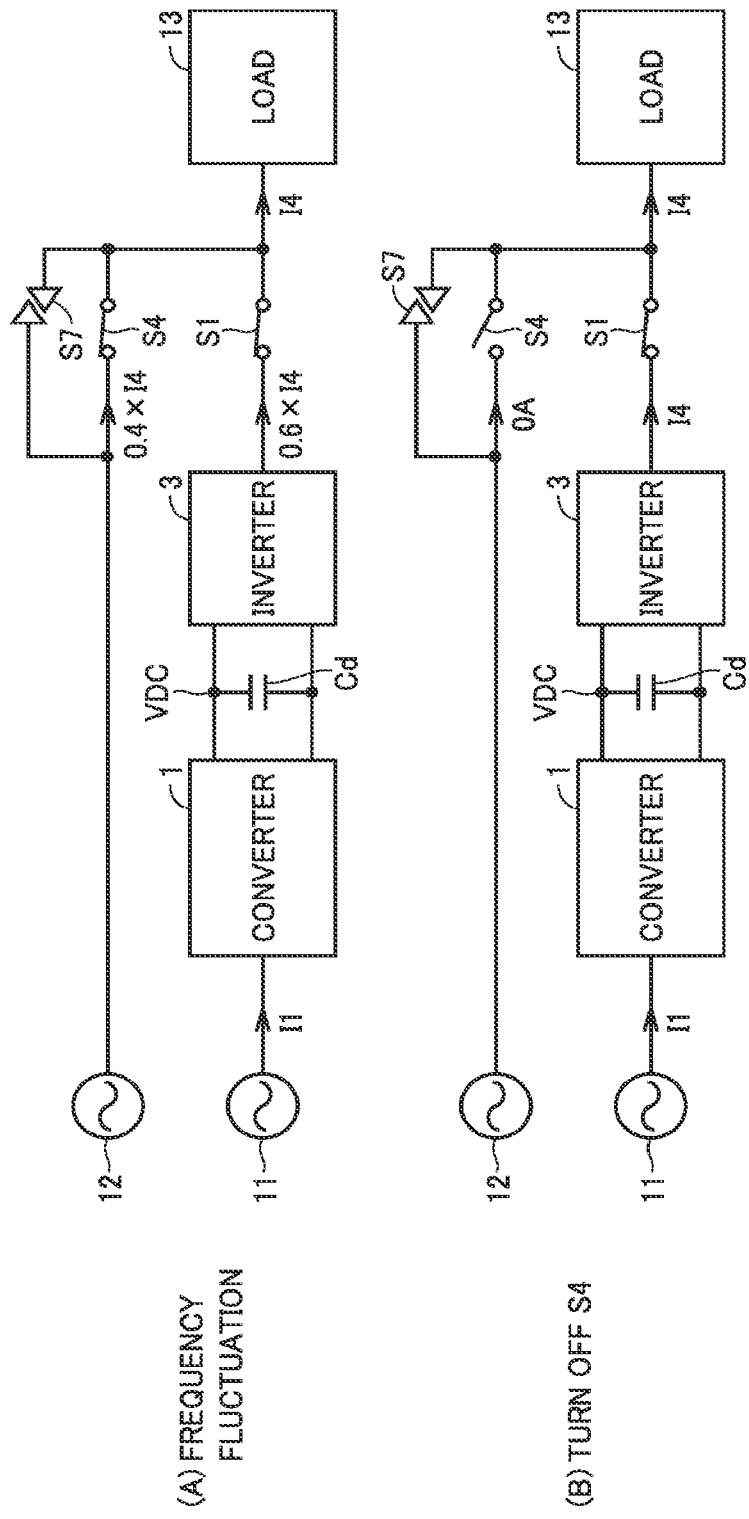
FIG. 17 is another circuit block diagram showing the comparative example of the embodiment.

In order to clarify the advantageous effects of the embodiment as described above, a comparative example of the above embodiment is described in the following. FIGS. 16 and 17 are each a circuit block diagram showing an operation of an uninterruptible power supply apparatus in the comparative example, to be compared with FIGS. 10 and 11. FIGS. 16 and 17 illustrate the operation in the comparative example in the switching period in which the bypass power feed mode is switched to the inverter power feed mode. In this comparative example, semiconductor switch 6 (i.e., thyristor switches S7 to S9) is not used in the switching period but is fixed in the OFF state.

In FIG. 16(A), in the bypass power feed mode, switch S4 of electromagnetic contactor 5 is ON, so that load current I4 is supplied from bypass AC power supply 12 to load 13 through switch S4. Inverter 3 is inactivated and switch S1 of electromagnetic contactor 4 is OFF, so that the output current from inverter 3 is 0 A.

As shown in FIG. 16(B), when an instruction is given to switch the bypass power feed mode to the inverter power feed mode, initially switch S1 is turned. Next, as shown in FIG. 16(C), inverter 3 is activated.

At the instant when inverter 3 is activated, inverter 3 is controlled such that the AC output voltage from inverter 3 and the AC output voltage from bypass AC power supply 12 are in phase with each other, and the peak value of the AC output voltage from inverter 3 is larger than the peak value of the AC output voltage from bypass AC power supply 12. Therefore, load current I4 is supplied from inverter 3 to load 13 through switch S1 and current flowing to switch S4 is 0 A.

However, when load current I4 is supplied from inverter 3, the load on bypass AC power supply 12 is alleviated suddenly, so that the frequency of bypass AC power supply 12, which is a private power generator, increases to cause a phase difference between the AC output voltage from inverter 3 and the AC output voltage from bypass AC power supply 12.

Therefore, as shown in FIG. 17(A), current I4 is supplied to load 13 from both inverter 3 and bypass AC power supply 12 at a ratio corresponding to the phase difference between them. FIG. 17(A) shows a case where 60% of load current I4 is supplied from inverter 3 and 40% of load current I4 is supplied from bypass AC power supply 12.

When current flows from inverter 3 to load 13, terminal-to-terminal voltage VDC of capacitor Cd decreases, and input current I1=IFB+1.0×I4 to converter 1 increases. In this case, input current I1 to converter 1 becomes greater than the output current 0.6×I4 from inverter 3, which cannot be followed by feedback control, and terminal-to-terminal voltage VDC of capacitor Cd increases. Next, as shown in FIG. 17(C), switch S4 is turned off, and the switching from the bypass power feed mode to the inverter power feed mode is completed.

FIG. 18 is a time chart showing the operation of the uninterruptible power supply apparatus shown in FIGS. 16 and 17, to be compared with FIG. 15. In FIG. 18, (A) to (F) indicate respective waveforms of mode select signal MS and signals φ4, φSA, φ5, φSB, and EN, respectively. In this comparative example, in the switching period in which the bypass power feed mode is switched to the inverter power feed mode, semiconductor switch 6 is not used but is fixed in the OFF state. In the initial state, mode select signal MS is set to "L" level and thus the bypass power feed mode is performed.

In the bypass power feed mode, control signal φ4 is set to "L" level to turn off electromagnetic contactor 4, and signal φSA is set to "L" level. Control signal φ5 is set to "H" level to turn on electromagnetic contactor 5, and signal φSB is set to "H" level. Further, control signal EN is set to "L" level to inactivate inverter 3.

At time t11, the inverter power feed mode is selected to cause mode select signal MS to rise from "L" level to "H" level and then, at time t12, control signal φ4 is caused to rise from "L" level to "H" level. After an elapse of a predetermined ON time from a rising edge of control signal φ4, switches S1 to S3 and SA of electromagnetic contactor 4 are turned on and signal φSA is caused to rise from "L" level to "H" level (time t13).

In response to a rising edge of signal φSA, control signal EN is caused to rise from "L" level to "H" level and inverter 3 is activated (time t13). Accordingly, three-phase AC power is supplied from inverter 3 to load 13 through electromagnetic contactor 4, and three-phase AC power is supplied from bypass AC power supply 12 to load 13 through semiconductor switch 6, so that the lap power feed mode is performed.

In response to a rising edge of signal φSA, control signal φ5 is caused to fall from "H" level to "L" level (time t1φ. After an elapse of a predetermined OFF time from a falling edge of control signal φ5, switches S4 to S6 and SB of electromagnetic contactor 5 are turned off and signal φSB is caused to fall from "H" level to "L" level (time t15). Accordingly, power feed from bypass AC power supply 12 is stopped, the lap power feed mode is thus ended, and the switching from the bypass power feed mode to the inverter power feed mode is completed. The lap power feed mode is performed from time t13 to time t15.

In this comparative example, in the switching period in which the bypass power feed mode is switched to the inverter power feed mode, electromagnetic contactors 4 and 5 are turned on and, in this state, inverter 3 is activated to start the lap power feed mode. Electromagnetic contactor 5 is turned off to end the lap power feed mode. Therefore, execution time TL2 for which the lap power feed mode is executed is longer than the OFF period of electromagnetic contactor 5, which may cause terminal-to-terminal voltage VDC of capacitor Cd to increase and exceed upper limit voltage VDCH during the lap power feed mode, and thereby cause stoppage of the operation of inverter 3 and resultant stoppage of the operation of load 13.

In contrast, in the present embodiment, semiconductor switch 6 and electromagnetic contactor 4 are turned on and, in this state, inverter 3 is activated to start the lap power feed mode, and semiconductor switch 6 is turned off to end the lap power feed mode. Therefore, time TL1 for the lap power feed mode can be shortened, to thereby reduce an increase of terminal-to-terminal voltage VDC of capacitor Cd in the lap power feed mode and thus prevent terminal-to-terminal voltage VDC of capacitor Cd from exceeding upper limit voltage VDCH.

It should be understood that the embodiments disclosed herein are illustrative and non-restrictive in every respect. The present invention is defined by the terms of the claims, rather than the description above, and is intended to include any modifications within the scope and meaning equivalent to the terms of the claims.

REFERENCE SIGNS LIST

C1 to C6, Cd capacitor; L1 to L6 reactor; CT1 to CT6 current detector; 1 converter; Lp DC positive bus; Ln DC negative bus; 2 bidirectional chopper; 3 inverter; 4, 5 electromagnetic contactor; S1 to S6 switch; SA, SB auxiliary switch; 6 semiconductor switch; S7 to S9 thyristor switch; 7 operation unit; 8 controller; 11 commercial AC power supply; 11d, 12d neutral point terminal; 11U, 11V, 11W, 12U, 12V, 12W AC power supply; 12 bypass AC power supply; 13 load; Q1 to Q6, Q11 to Q16 IGBT; D1 to D6, D11 to D16 diode; 21, 22 signal generating circuit; 23, 27, 30 control unit; 25 timer; 26 reference voltage generating circuit

The invention claimed is:

1. An uninterruptible power supply apparatus comprising:
a first electromagnetic contactor having a first terminal receiving a first AC voltage supplied from a first AC power supply and a second terminal connected to a load;
a semiconductor switch connected in parallel with the first electromagnetic contactor;
a rectifier that converts a second AC voltage supplied from a second AC power supply to a DC voltage;
a capacitor that smooths the DC voltage output from the rectifier; an inverter that converts a terminal-to-terminal voltage of the capacitor to a third AC voltage;
a second electromagnetic contactor having a first terminal receiving the third AC voltage and a second terminal connected to the load; and
a controller that controls the uninterruptible power supply apparatus, wherein
(i) in a first mode in which the first AC voltage is supplied to the load, the controller turns on the first electromagnetic contactor and turns off the semiconductor switch and the second electromagnetic contactor,
(ii) in a second mode in which the third AC voltage is supplied to the load, the controller turns off the first electromagnetic contactor and the semiconductor switch and turns on the second electromagnetic contactor, and
(iii) in a switching period in which the first mode is switched to the second mode, the controller turns on the semiconductor switch and the second electromagnetic contactor, turns off the first electromagnetic contactor, activates the inverter, and thereafter turns off the semiconductor switch, wherein the uninterruptible power supply apparatus further includes
a first current detector that detects AC current flowing between the second AC power supply and the rectifier; and
a second current detector that detects load current,
wherein the controller controls the rectifier based on result of detection by the first current detector and the second current detector, and passes AC current from the second AC power supply to the rectifier such that the terminal-to-terminal voltage of the capacitor becomes a reference voltage, wherein the AC current includes a feedback component having a value corresponding to a deviation between the reference voltage and the terminal-to-terminal voltage of the capacitor, and a feedforward component obtained by multiplying the load current by a gain.

2. An uninterruptible power supply apparatus comprising:
a first electromagnetic contactor having a first terminal receiving a first AC voltage supplied from a first AC power supply and a second terminal connected to a load
a semiconductor switch connected in parallel with the first electromagnetic contactor;
a rectifier that converts a second AC voltage supplied from a second AC power supply to a DC voltage;
a capacitor that smooths the DC voltage output from the rectifier; an inverter that converts a terminal-to-terminal voltage of the capacitor to a third AC voltage;
a second electromagnetic contactor having a first terminal receiving the third AC voltage and a second terminal connected to the load and a controller that controls the uninterruptible power supply apparatus, wherein
(i) in a first mode in which the first AC voltage is supplied to the load, the controller turns on the first electromagnetic contactor and turns off the semiconductor switch and the second electromagnetic contactor,
(ii) in a second mode in which the third AC voltage is supplied to the load, the controller turns off the first electromagnetic contactor and the semiconductor switch and turns on the second electromagnetic contactor, and
(iii) in a switching period in which the first mode is switched to the second mode, the controller turns on the semiconductor switch and the second electromagnetic contactor, turns off the first electromagnetic contactor, activates the inverter, and thereafter turns off the semiconductor switch, wherein the uninterruptible power supply apparatus, further includes a first current detector that detects AC current flowing between the second AC power supply and the rectifier; and a second current detector that detects load current, wherein the controller controls the rectifier based on result of detection by the first current detector and the second current detector, passes, in the first mode and the second mode, AC current from the second AC power supply to the rectifier such that the terminal-to-terminal voltage of the capacitor becomes a first reference voltage, wherein the AC current includes a feedback component having a value corresponding to a deviation between the first reference voltage and the terminal-to-terminal voltage of the capacitor, and a feedforward component obtained by multiplying the load current by a gain, and passes, in the switching period, AC current from the second AC power supply to the rectifier such that the terminal-to-terminal voltage of the capacitor becomes a second reference voltage higher than the first reference voltage, to prevent circulating current from flowing from one of the first AC power supply and the second AC power supply to the other of the first AC power supply and the second AC power supply through the capacitor, wherein the AC current includes a feedback component having a value corresponding to a deviation between the second reference voltage and the terminal-to-terminal voltage of the capacitor, and a feedforward component obtained by multiplying the load current by a gain.

3. The uninterruptible power supply apparatus according to claim 2, wherein each of the first AC power supply and the second AC power supply includes a three-phase AC power supply start-connected to a neutral point, the neutral point of the first AC power supply and the neutral point of the second AC power supply are both grounded, each of the first AC voltage, the second AC voltage, and the third AC voltage includes a three-phase AC voltage, the first electromagnetic contactor includes three first terminals receiving the three-phase AC voltage included in the first AC voltage, and three second terminals connected to the load, the semiconductor switch includes three first terminals receiving the three-phase AC voltage included in the first AC voltage, and three second terminals connected to the load, the second electromagnetic contactor includes three first terminals receiving the three-phase AC voltage included in the third AC voltage, and three second terminals connected to the load, the first reference voltage is lower than a voltage twice a peak value of the second AC voltage, and the second reference voltage is higher than or equal to the voltage twice the peak value of the second AC voltage.

4. The uninterruptible power supply apparatus according to claim 3, wherein the first AC power supply is a power generator, and the second AC power supply is a commercial AC power supply.

5. The uninterruptible power supply apparatus according to claim 1, further comprising a bidirectional chopper that stores DC power generated by the rectifier in a power storage device in a sound state of the second AC power supply, and supplies DC power in the power storage device to the inverter at a time of a power failure of the second AC power supply.

6. The uninterruptible power supply apparatus according to claim 2, further comprising a bidirectional chopper that stores DC power generated by the rectifier in a power storage device in a sound state of the second AC power supply, and supplies DC power in the power storage device to the inverter at a time of a power failure of the second AC power supply.

\* \* \* \* \*